(12) United States Patent
Mironov et al.

(10) Patent No.: US 8,431,511 B2
(45) Date of Patent: *Apr. 30, 2013

(54) HYDROPROCESSING BULK CATALYST AND METHODS OF MAKING THEREOF

(75) Inventors: Oleg Mironov, Hercules, CA (US); Alexander E. Kuperman, Orinda, CA (US); Jinyi Han, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/625,399

(22) Filed: Nov. 24, 2009

(65) Prior Publication Data

US 2011/0124498 A1    May 26, 2011

(51) Int. Cl.
*B01J 31/00* (2006.01)
*B01J 21/00* (2006.01)
*B01J 27/049* (2006.01)
*B01J 27/24* (2006.01)
*B01J 37/20* (2006.01)

(52) U.S. Cl.
USPC ........... 502/221; 502/200; 502/219; 502/220; 502/222; 502/223; 502/167; 502/168

(58) Field of Classification Search .................. 502/200, 502/219, 220, 221, 222, 223, 167, 168
See application file for complete search history.

(56) References Cited

U.S. PATENT DOCUMENTS

| | | | | |
|---|---|---|---|---|
| 5,164,075 A | * | 11/1992 | Lopez | 208/215 |
| 5,484,755 A | * | 1/1996 | Lopez | 502/219 |
| 7,396,799 B2 | * | 7/2008 | Chen et al. | 502/216 |
| 7,410,928 B2 | * | 8/2008 | Chen et al. | 502/216 |
| 7,754,645 B2 | * | 7/2010 | Kuperman et al. | 502/200 |
| 7,947,623 B2 | * | 5/2011 | Mironov et al. | 502/219 |

OTHER PUBLICATIONS

PCT International Search Report and Written Opinion, International Application No. PCT/US2010/057031, dated Jul. 28, 2011, pp. 1-11.

* cited by examiner

*Primary Examiner* — Elizabeth Wood

(57) ABSTRACT

A hydroprocessing bulk catalyst is provided. A process to prepare hydroprocessing bulk catalysts is also provided. The hydroprocessing catalyst has the formula $(R^p)_i(M^t)_a(L^u)_b(S^v)_d(C^w)_e(H^x)_f(O^y)_g(N^z)_h$, wherein M is at least at least a "d" block element metal; L is also at least a "d" block element metal, but different from M; t, u, v, w, x, y, z representing the total charge for each of the components (M, L, S, C, H, O and N, respectively); R is optional and in one embodiment, R is a lanthanoid element metal; $0<=i<=1$; $pi+ta+ub+vd+we+xf+yg+zh=0$; $0<b$; $0<b/a=<5$; $0.5(a+b)<=d<=5(a+b)$; $0<e<=11(a+b)$; $0<f<=7(a+b)$; $0<g<=5(a+b)$; $0<h<=2(a+b)$. The catalyst has an X-ray powder diffraction pattern with at least three diffractions peak located at 2-θ angles of greater than 25°. In one embodiment, the catalyst is prepared by forming at least a sulfided catalyst precursors from at least two "d" block element metals; and mixing the catalyst precursor with a hydrocarbon compound to form the hydroprocessing catalyst composition. In another embodiment, the catalyst is prepared by the thermal decomposition of an oil dispersible sulfur containing organic metal precursor upon contact with a hydrocarbon oil, generating a slurry catalyst. In yet another embodiment, the catalyst is prepared from an in-situ or ex-situ sulfidation of "d block element metal precursors in a solvent carrier.

27 Claims, 5 Drawing Sheets

HYDROPROCESSING BULK CATALYST AND METHODS OF MAKING THEREOF

TECHNICAL FIELD

The invention relates generally to bulk catalysts for use in the conversion of a hydrocarbon feedstock such as coal, heavy oils and residua, and methods for making the bulk catalysts thereof.

BACKGROUND

The petroleum industry is increasingly turning to heavy crudes, resids, coals and tar sands as sources for feedstocks. Feedstocks derived from these heavy materials contain more sulfur and nitrogen than feedstocks derived from more conventional crude oils, requiring a considerable amount of upgrading in order to obtain usable products therefrom. The upgrading or refining is accomplished by hydrotreating processes, i.e., treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds.

Sulfides of "d" block metal elements of the Periodic Table, have been used in the liquefaction of carbonaceous material, such as coal. U.S. Pat. No. 4,441,983 discloses the use of an activated zinc sulfide catalyst in the form of a zinc sulfide of a reagent quality or a beneficiated ore. Iron-containing compounds such as pyrites ($FeS_2$) and red mud ($Fe_2O_3$) have been disclosed as catalysts for coal hydrogenation and liquefaction processes.

There is a need for improved catalysts with optimum morphology, structure and improved catalytic activity for high yield conversions. There is also a need for an improved process to prepare bulk catalysts for use in the conversion of heavy oils and residua. The invention relates to a novel bulk catalyst based on sulfide(s) of "d" block metals for use in the conversion of heavy oils and residua.

SUMMARY OF THE INVENTION

In one aspect, this invention relates to a slurry catalyst composition having a formula: $(R^p)_i(M^t)_a(L^u)_b(S^v)_d(C^w)_e(H^x)_f(O^y)_g(N^z)_h$, wherein M is at least a "d" block element metal; L is at least a "d" block element metal different from the "d" block element metal M; R is optional and in one embodiment, R is a lanthanoid element; $0 <= i <= 1$; $0 < b/a =< 5$; $0.5(a+b) <= d <= 5(a+b)$; $0 < e <= 11(a+b)$; $0 < f <= 7(a+b)$; $0 < g <= 5(a+b)$; $0 < h <= 2(a+b)$; p, t, u, v, w, x, y, z, each representing total charge for each of: M, L, S, C, H, O and N, respectively, wherein $pi+ta+ub+vd+we+xf+yg+zh=0$. In one embodiment, the catalyst has an X-ray powder diffraction pattern with at least three diffraction peaks located at $2\text{-}\theta$ angles of greater than $25°$.

In one aspect, there is provided a process for preparing a catalyst composition, which process comprising the steps of combining at least two different metal precursors of "d" block element metals with a sulfiding agent forming at least a sulfided catalyst precursor; and iii) mixing the sulfided catalyst precursor with a hydrocarbon compound to form the catalyst composition of the formula: $(R^p)_i(M^t)_a(L^u)_b(S^v)_d(C^w)_e(H^x)_f(O^y)_g(N^z)_h$. In one embodiment, both metal precursors are sulfided, either separately or together in one step.

In another aspect, there is provided a process for preparing a catalyst composition, which process comprising the steps of providing at least two different metal precursors of "d" block element metals, with at least one of the metal precursors being an oil dispersible sulfur containing organic compound, and mixing the metal precursors with a hydrocarbon compound under conditions sufficient for the oil dispersible sulfur containing organic ionic compound to thermally decompose, releasing sulfur for the sulfidation of the metal precursors, forming the catalyst composition of the formula: $(R^p)_i(M^t)_a(L^u)_b(S^v)_d(C^w)_e(H^x)_f(O^y)_g(N^z)_h$.

In yet another aspect, there is provided a process for preparing a catalyst composition comprising providing a catalyst precursor with at least two metal precursors of different "d" block element metals in a solvent carrier, then combining the catalyst precursor with a sulfiding agent and a hydrocarbon feedstock, forming the catalyst composition of the formula $(R^p)_i(M^t)_a(L^u)_b(S^v)_d(C^w)_e(H^x)_f(O^y)_g(N^z)_h$. In one embodiment, the solvent carrier is selected from the group of alcohols, ketones, aldehydes, citric acid, carboxylic acids, water, and mixtures thereof. In one embodiment, the mixture of catalyst precursor in a solvent carrier is employed to impregnate coal particles as the hydrocarbon feedstock, then the coal particles impregnated with the catalyst precursors are combined with a solvent, converting the catalyst precursor into the catalyst composition of the formula: $(R^p)_i(M^t)_a(L^u)_b(S^v)_d(C^w)_e(H^x)_f(O^y)_g(N^z)_h$.

DETAILED DESCRIPTION

Figure 1:
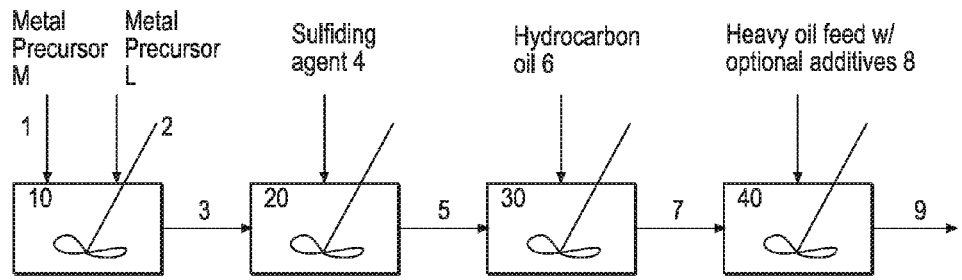
FIG. 1 illustrates the steps involved in an embodiment for preparing the catalyst composition with at least a sulfiding step.

The following terms will be used throughout the specification and will have the following meanings unless otherwise indicated.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. The bulk catalyst is a dispersing-type catalyst ("slurry catalyst") for use as dispersed catalyst particles in mixture of liquid (e.g., hydrocarbon oil). In one embodiment, the bulk catalyst is formed through precipitation. In another embodiment, the bulk catalyst has a binder incorporated into the catalyst composition. In yet another embodiment, the bulk catalyst is formed from metal compounds and without any binder.

As used herein, "heavy oil" feed or feedstock refers to heavy and ultra-heavy crudes, including but not limited to resids, coals, bitumen, shale oils, tar sands, etc. Heavy oil feedstock may be liquid, semi-solid, and/or solid. Examples of heavy oil feedstock that might be upgraded as described herein include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include bottom of the barrel and residuum left over from refinery processes, including "bottom of the barrel" and "residuum" (or "resid")—atmospheric tower bottoms, which have a boiling point of at least 343° C. (650° F.), or vacuum tower bottoms, which have a boiling point of at least 524° C. (975° F.), or "resid pitch" and "vacuum residue"—which have a boiling point of 524° C. (975° F.) or greater.

Properties of heavy oil feedstock may include, but are not limited to: TAN of at least 0.1, at least 0.3, or at least 1; viscosity of at least 10 cSt; API gravity at most 15 in one embodiment, and at most 10 in another embodiment. A gram of heavy oil feedstock typically contains at least 0.0001 grams of Ni/V/Fe; at least 0.005 grams of heteroatoms; at least 0.01 grams of residue; at least 0.04 grams C5 asphaltenes; at least 0.002 grams of MCR; per gr$^a$m of cr$^u$de; at least 0.00001 grams of alkali metal salts of one or more organic acids; and at $^l$east 0.005 grams of sulfur. In one embodiment, the heavy oil feedstock has a sulfur content of at least 5 wt. % and an API gravity of from −10 to +10.

In one embodiment, the heavy oil feedstock comprises Athabasca bitumen (Canada) having at least 50% by volume vacuum resid. In another embodiment, the feedstock is a Boscan (Venezuela) feed with at least 64% by volume vacuum residue. In one embodiment, the heavy oil feedstock contains at least 100 ppm V (per gram of heavy oil feedstock). In another embodiment, the V level ranges between 500 and 1000 ppm. In a third embodiment, at least 2000 ppm.

The terms "treatment," "treated," "upgrade", "upgrading" and "upgraded", when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range of the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing." Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

As used herein, hydrogen refers to hydrogen, and/or a compound or compounds that when in the presence of a heavy oil feed and a catalyst react to provide hydrogen.

As used herein, the term "surfactant" (can be used interchangeably with "surface active agent," "stabilizer, or "surface modifier") refers generally to any material that operates to low the surface tension of a liquid, thus improving the wetting at the interface between the dispersed catalyst particles and the hydrocarbon oil. Alternatively or in combination, the surfactant operates to lower the surface tension between the catalyst material in suspension and the solvent/solution in which the catalyst material is suspended, thus in one embodiment the surfactant allows controlled and dispersed layering of the catalyst particles in the solution that contains the catalyst material.

As used herein, the term "catalyst precursor" refers to a compound containing one or more catalytically active metals, from which compound the catalyst having the formula $(R^P)_i (M^r)_a(L^u)_b(S^v)_d(C^w)_e(H^x)_f(O^y)_g(N^z)_h$ is eventually formed, and which compound may be catalytically active as a hydroprocessing catalyst. The catalyst precursor can be transformable into the catalyst via chemical reaction with one or more reagents (such as sulfiding and/or reducing agents, e.g., hydrogen, such as within a hydrocarbon medium) and/or via any other suitable treatment (such as thermal treatment, multi-step thermal treatment, pressure treatment, or any combination thereof).

As used herein, the phrase "one or more of" or "at least one of" when used to preface several elements or classes of elements such as X, Y and Z or $X_1$—$X_n$, $Y_1$—$Y_n$ and $Z_1$—$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$). X, Y, and Z here are simple meant as examples for explanation here.

SCF/BBL (or scf/bbl) refers to a unit of standard cubic foot of gas ($N_2$, $H_2$, etc.) per barrel of hydrocarbon feed.

The Periodic Table referred to herein is the Table approved by IUPAC and the U.S. National Bureau of Standards, an example is the Periodic Table of the Elements by Los Alamos National Laboratory's Chemistry Division of October 2001.

"d" block elements refer to elements of the Period Table wherein the d sublevel of the atom is being filled. Examples include Sc, Ti, V, Cr, Mn, Fe, Co, Ni, Cu, and Zn.

Lanthanoid (or lanthanide, or sometimes referred to as rare earths) elements refer to the fifteen elements in the Periodic Table with atomic numbers 57 through 71.

"Oil dispersible" compound means that the compound scatters or disperses in oil forming a dispersion. In one embodiment, the oil dispersible compound is oil soluble which dissolves upon being mixed with oil.

Catalyst Formula: In one embodiment, the catalyst composition as expressed in elemental form, is of the general formula $((R^p)_i(M^t)_a(L^u)_b(S^v)_d(C^w)_e(H^x)_f(O^y)_g(N^z)_h$. The formula herein refers to the catalyst solids, constituting the catalyst slurry in oil. In the equation, M and L each represents at least a "d" block element from the Periodic Table such as Sc, Ti, V, Cr, Mn, Fe, Co, Ni and Cu and M is different from L. R is optional. In one embodiment, R is at least one of lanthanoid element from the Periodic Table such as La, Ce, Nd, etc. In another embodiment, R is at least an alkali earth metal such as magnesium.

Also in the equation, p, t, u, v, w, x, y, z representing the total charge for each of the component (R, M, L, S, C, H, O and N, respectively); $pi+ta+ub+vd+we+xf+yg+zh=0$. R with a subscript i ranging from 0 to 1. M and L with subscripts a and b, with values of a and b respectively ranging from 0 to 5, and ($0<=b/a<=5$). S represents sulfur with the value of the subscript d ranging from $0.5(a+b)$ to $5(a+2b)$. C represents carbon with subscript e having a value of 0 to $11(a+b)$. H is hydrogen with the value of f ranging from 0 to $7(a+b)$. O represents oxygen with the value of g ranging from 0 to $5(a+b)$; and N represents nitrogen with h having a value of 0 to $2(a+b)$. In one embodiment, a sufficient amount of metal precursors are present for b/a to have a molar ratio ranging from 0.10 to 10.

In one embodiment, the catalyst of the formula $(R^p)_i(M^t)_a(L^u)_b(S^v)_d(C^w)_e(H^x)_f(O^y)_g(N^z)_h$ has a M to L ratio in the range of 1:10-10:1 (as molar ratio). In a second embodiment, the ratio is in the range of 1:5 to 5:1. In a third embodiment, the zinc to iron ratio is in the range of 1:10 to 1:5. In one embodiment, M is iron and L is zinc (or vice versa). In a second embodiment, M is iron and L is titanium (or vice versa). In a third embodiment, M is iron and L is manganese (or vice versa). In a fourth embodiment, M is iron and L is copper (or vice versa). In a fifth embodiment, M is iron and L is nickel (or vice versa). In a sixth embodiment, M is copper and L is iron (or vice versa). In a seventh embodiment, M is cobalt and L is iron (or vice versa). In an eight embodiment, M is iron and L is chromium (or vice versa). In a ninth embodiment, M is titanium and L is iron (or vice versa).

In one embodiment, the catalyst has the formula $(Fe_zZn_{1-z})_a(S)_d(C)_e(H)_f(O)_g(N)_h$, wherein the zinc to iron ratio is in the range of 9:1-1:9 (as wt. %). In one embodiment, the zinc to iron ratio is in the range of 1:5 to 5:1. In a third embodiment, the zinc to iron ratio is in the range of 1:10 to 1:5. In a fourth embodiment, the Fe Zn catalyst has a zinc to iron ratio (wt. %) of about 1:1. In a fifth embodiment, the Fe:Zn wt. ratio ranges from 40% to 60%. In a sixth embodiment, the Zn to total Fe+Zn (wt. %, metal basis) ranges from 40% to 75%, with 60% being the most preferred.

The sections that follow describe reagents that can be used in the manufacture of the catalyst. The term reagent refers to a raw material that can be used in the manufacture of the catalyst, which can be in their elemental, compound, or ionic form.

The term "metal" refers to "d" block element reagents in their elemental, compound, or ionic form. The term "metal" or "metal precursor" in the singular form is not limited to a single metal or metal precursor. The term "in the solute state" in one embodiment means that the metal component is in a protic liquid form. The term "metal precursor" refers to the metal compound to the process.

Metal Precursor Components: "M" and "L" are derived from metal precursor components. In one embodiment, at least part of the metal precursors is added in the solid state. In a second embodiment, at least part of the metal precursors is added in the solute state. In a third embodiment, at least one of the metal precursors may be oil soluble, oil dispersible, water soluble and/or water dispersible. The metal precursors can be provided as an elemental metal or as a metal compound. One of the metal precursors can be added in the solid state, while the second metal precursor can be added in the solute state. The metal precursors can be the same or different, i.e., all organic compounds, all inorganic compounds, or one organic and one inorganic. The metal precursors in one embodiment can be catalytically active, e.g., a reagent grade metal sulfide or a benficated ore.

In one embodiment, at least one of metal precursors is selected from inorganic compounds, including but not limited to sulfates, nitrates, carbonates, sulfides, oxysulfides, oxides and hydrated oxides, ammonium salts and heteropoly acids of "d" element metals.

In one embodiment, at least one of the metal precursors is an organic compound. In one embodiment, the organic metal precursors are selected from the group of "d" block metal salts of organic acids, such as acyclic and alicyclic aliphatic, carboxylic acids containing two or more carbon atoms. Non-limiting examples of the organic acid salts include acetates, oxylates, citrates, napthanates and octoates. In another embodiment, the metal precursors are selected from salts of organic amines such as aliphatic amines, aromatic amines, quaternary ammonium compounds, and mixtures thereof. In yet another embodiment, the metal precursors are selected from organometallic compounds. Examples include but are not limited to chelates such as 1,3-diketones, ethylene diamine, ethylene diamine tetraacetic acid, and phthalocyanines of "d" block element metals and mixtures thereof. In a fourth embodiment, the metal precursors are sulfur-containing organic compounds, e.g., a chelate compound with sulfur as a coordinating atom such as sulfhydryl S—H. Examples include but are not limited to thiols such as dialkyldithiophosphates, thio- or dithiocarbamates, phosphorothioates, thiocarbonates, trimercaptotriazine, thiophenates, mercaptans, thiol carboxylic acids RC(O)SH, dithio acids RC(S)SH, and related compounds.

Examples of metal precursors include but are not limited to ferric sulfide, ferrous sulfide, iron sulfide, zinc sulfide, ferric sulfate, ferric nitrate, ferrocene, ferric phosphate, cobalt sulfate, cobalt nitrate, cobalt phosphate, nickel sulfate, nickel nitrate, nickel phosphate, copper sulfate, copper nitrate, copper phosphate, copper acetate, cobalt acetate, nickel acetate, copper naphthenate, copper acetate, cobalt naphthenate, copper oxide, copper hydroxide, nickel oxide, nickel hydroxide, cobalt oxide, titanium tetraphenolate, titanium naphthenate, nickel naphthenate, titanium dithiocarbamate, titanyl sulfate, zinc alkyl dithiocarbamate, zinc alkyl phosphorodithioate, zinc mercaptobenzothiazole, zinc dibenzyldithiocarbamate, copper dithiocarbamate, manganese acetate, zinc dialkyldithiophosphate, and combinations thereof. In one embodiment, the metal precursors are selected from zinc sulfide crystalline powder, zinc-iron sulfide powder, iron sulfide powder. In one embodiment, the metal precusor powder has an average particle size of less than 10 microns. In a second embodiment, the average particle size is about 1.0 to 20.0 microns In one embodiment, the metal precursor is a water-soluble nickel component, e.g. nickel nitrate, nickel sulfate, nickel acetate, nickel chloride, or mixtures thereof. In another embodiment, the metal precursor is a nickel compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof. In a third embodiment, the metal precursor is a water-soluble nickel sulfate solution. In yet another embodiment, the metal precursor is a water-soluble reagent, e.g., an iron component in the solute state selected from iron acetate, chloride, formate, nitrate, sulfate and mixtures thereof.

Sulfiding Agent: The use of sulfiding agent depends whether at least one of the metal precursors already contains sufficient sulfur in a readily releasable form for the sulfidation of the metal precursors in-situ or ex-situ. In one embodiment wherein at least one of the metal precursors is an oil soluble or oil dispersible sulfur containing compound with excess sulfur already present in the compound (for the stoichiometric formation of the sulfide catalyst), sulfiding agents may not be needed.

In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or in $H_2$.

The sulfiding agent is present in an amount in excess of the stoichiometric amount required to form the catalyst. In one embodiment, the amount of sulfiding agent represents a sulfur to the "d" block element metal ("M" and "L") mole ratio of at least 3 to 1 to produce a sulfided catalyst from the catalyst precursor. In another embodiment, the total amount of sulfur-containing compound is generally selected to correspond to any of about 50-300%, 70-200%, and 80-150%, of the stoichiometric sulfur quantity necessary to convert the metals into for example, ZnS, $N_{i3S2}$, TiS, etc.

Suitable sulfiding agents include but are not limited to, for example, any sulfur compound that is in a readily releasable form, for example, ammonium sulfide, ammonium polysulfide $((NH_4)_2S_x)$, ammonium thiosulfate $((NH_4)_2S_2O_3)$, sodium thiosulfate $(Na_2S_2O_3)$, thiourea $(CSN_2H_4)$, carbon disulfide $(CS_2)$, dimethyl disulfide (DMDS), dimethyl sulfide (DMS), tertiarybutyl polysulfide (PSTB), tertiarynonyl polysulfide (PSTN), mercaptanes, thioglycols, and mixtures thereof. In another embodiment, the sulfiding agent is selected from alkali- and/or alkaline earth metal sulfides, alkali- and/or alkaline earth metal hydrogen sulfides, and mixtures thereof. The use of sulfiding agents containing alkali- and/or alkaline earth metals may require an additional separation process step to remove the alkali- and/or alkaline earth metals from the spent catalyst.

In one embodiment, the sulfiding agent is ammonium sulfide in aqueous solution. An aqueous ammonium sulfide solution can be synthesized from hydrogen sulfide and ammonia—common refinery off-gases. This synthesized ammonium sulfide is readily soluble in water and can easily be stored in aqueous solution in tanks prior to use. Since ammonium sulfide solution is more dense than resid, it can be separated easily in a settler tank after reaction.

The sulfiding agent can be added in any suitable form. In one embodiment, elemental sulfur is added to the pretreated carbonaceous material mixture in the form of a sublimed powder or as a concentrated dispersion (such as a commercial flower of sulfur). Allotropic forms of elemental sulfur, such as orthorhomic and monoclinic sulfur, are also suitable for use herein. In one embodiment, the one or more sulfur compounds are in the form of a sublimed powder (flowers of sulfur), a molten sulfur, a sulfur vapor, or a combination or mixture thereof.

Optional Binders: In one embodiment, a binder is optionally included in the process for making the catalyst. Generally, the binder material has less catalytic activity than the catalyst composition (without the binder material) or no catalytic activity at all. Consequently, by adding a binder material, the activity of the catalyst composition may be reduced. Therefore, the amount of binder material to be added in the process generally depends on the desired activity of the final catalyst composition. Binder amounts from 0-95 wt. % of the total composition can be suitable, depending on the envisaged catalytic application. In another embodiment, binder can be optionally added in the range of 0.5-75 wt. % of the total composition.

The binder materials can be added to the metal precursors either simultaneously or one after the other. Alternatively, the metal precursors can be combined together and subsequently a binder material can be added to the combined metal precursors. It is also possible to combine part of the metal precursors either simultaneously or one after the other, to subsequently add the binder material and to finally add the rest of the metal precursors either simultaneously or one after the other. Furthermore, it is also possible to combine the binder with metal precursors in the solute state and to subsequently add a metal precursor at least partly in the solid state.

Optional binder materials include any materials that are conventionally applied as a binder in hydroprocessing catalysts. Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. In one embodiment, binder materials are selected from silica, colloidal silica doped with aluminum, silica-alumina, alumina, titanium, zirconia, or mixtures thereof. In one embodiment, the catalyst comprises a refractory oxide material which comprises 50 wt. % or more titania, on oxide basis.

These binders may be applied as such or after peptization. It is also possible to apply precursors of these binders that, during the process are converted into any of the above-described binders. Suitable precursors are, e.g., alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

In one embodiment where alumina is used as a binder, the alumina binder has a surface area ranging from 100 to 400 $m^2/g$, with a pore volume ranging from 0.5 to 1.5 ml/g measured by nitrogen adsorption. In one embodiment where titania is used as a binder, the titania has an average particle size of less than 50 microns. In a second embodiment, the titania binder has an average particle size of less than 5 microns. In a third embodiment, the titania binder has an average particle size of greater than 0.005 microns. In a fourth embodiment, the titania binder has a BET surface area of 10 to 700 $m^2/g$.

Optional Sulfur Additives: The use of the sulfur additive is optional. In one embodiment, at least a sulfur additive (also referred to as "sulfiding additive") is added in mixture with any of the sulfiding agents described above, the (M)-metal precursor, the (L)-metal precursor, separately or in a mixture with all reagents. In one embodiment, the role of the sulfur additive is to increase the incorporation of sulfur in the catalyst, and in another embodiment, increasing the stability of the catalyst activities.

In one embodiment, the amount of sulfur additive (used interchangeably with additives) ranges from 5 to 50 wt. % of the amount of sulfur introduced in the catalyst (via the sulfiding agent). In a second embodiment, this amount ranges from 10 to 40 wt. % of the amount of sulfur introduced in the catalyst. In a third embodiment, from 15 to 30 wt. %. The sulfur additive can be added either in the pure state or dissolved in a suitable solvent, e.g., water.

In one embodiment, the sulfur additive is selected from the group of thiodiazoles, thio acids, thio amides, thiocyanates, thio esters, thiophenols, thiosemicarbazides, thioureas, and mixtures thereof. Examples include but are not limited to, thiobenzoic acid, 2-thiocresol, 3-thiocresol, 4-thiocresol, 3,3'-thiodipropionic acid, 3,3'-thiodipropionitrile, 2,3,6-trimethyl thiophenol, methyl thioglycolate, 4-methyl-3-thiosemicarbazide, naphthalene-2-thiol, phenyl isothiocyante, 2-phenyl thiophenol, thioacetamide, thiobenzamide, 2,6-dimethyl thiophenol, 3,5-dimethyl thiophenol, 2,2'-dinitrodiphenyl disulfide, 2,5-dithiobiurea, ethyl thioglycolate, 2-methoxy thiophenol, 3-methoxy thiophenol, 2-methyl-5-mercapto-1,3,4-thiadiazole, amidinothiourea, 2-amino-5-ethylthio-1,3,4-thiadiazole, 2-amino-5-mercapto-1,3,4-thiadiazole, 3-amino-5-mercapto-1,2,4-triazole, 2-amino thiophenol, benzene-1,3-dithiol, 3-chlorothiophenol and 2,5-dimercapto-1,3,4-thiadiazole (D.M.T.D.).

In another embodiment, the sulfur additive is selected from the group of mercapto alcohols. Examples are compounds of formula HS—$CH_2$—$CH_2OH$ (2-mercaptoethanol) and HS—$CH_2$—$C(C_6H_5)$H—OH (1-mercapto-2-phenyl-2-ethanol). In yet another embodiment, the sulfur additive is one of dialkyl sulfides (such as di-n-butyl sulfides, di-tert-butyl sulfides), dihydroxyalkyl sulfides (such as thiodiethylene glycol ($S(CH_2CH_2OH)_2$), thiodipropylene glycol), diaryl sulfides (such as diphenyl sulfide), diaralkyl sulfides (such as dibenzyl sulfide), alkyl ethers, thiophenols (such as thioanisole), cyclic thio ethers and their substituted derivatives (such as ethylene sulfide, thiophene, thiazole, thiopyrone, thioxanthone, thioxanehydrol, 1,4-thioxane), dimethyl sulfoxide, ethylthiol ethanol, thioglycolic acid, dithioglycol, and diethanol disulfide.

In one embodiment, the sulfur additive is a commercially available sulfur-containing compound, e.g., tert-nonylpolysulfide such as TPS-374 from Atofina Company or catalyst presulfiding agent SulfiZol™ from Lubrizol Corp.

In another embodiment, the sulfur additive is sulphur in powder form (flowers of sulphur), which can be used in suspension either alone or mixed with another sulphur compound (e.g. an organic polysulphide) in exemplified weight proportions of 5 to 90% polysulphide and 95 to 10% elementary sulphur in one example, and 20 to 50% polysulphide and 80 to 50% elementary sulphur in another example.

In another embodiment, the sulfur additive is selected from the group of dimethyl sulphide DMS, dimethyl disulphide DMD, diethanol disulfide or 2,2-dithiobis ethanol (DEODS) soluble in water, glycols, and polyglycols. In one example, the sulfur additive is DEODS mixed in formic acid or a methyl formate organic solution.

Optional Surfactant: The use of a surfactant component is optional. In one embodiment, a surfactant is used. The surfactant can be any suitable surfactant which use favorably improves the bulk catalyst's characteristics, including its dispersion, metal surface area, morphology and the like, employed in an amount ranging from in an amount of 0.001 to 5 wt. %. In a second embodiment, the amount of surfactant ranges from 0.005 to 3 wt. %. In a third embodiment, from 0.01 to 2 wt. %.

In one embodiment, the optional surfactant is added to the metal precursor components either simultaneously or one after the other. Alternatively, the metal precursors can be combined together first and subsequently the surfactant can be added to the combined metal precursors. In another embodiment, the surfactant is added to the hydrocarbon transforming agent to enhance the micro-emulsion formation. In one embodiment, the amount of surfactant added to the hydrocarbon transforming agent ranges from 0.005 to 3 wt. %. In another embodiment, it ranges from 0.01 to 2 wt. %.

In yet one embodiment as known in the art, the surfactant can be added to the feedstock to the hydroprocessing operation, e.g., a heavy oil feed stream to be hydroconverted, instead of or in addition to the addition of the surfactant to the hydrocarbon transforming agent. If the surfactant is solely added to the hydroconversion feedstock, the amount to be added ranges from 0.001 to 0.05 wt. % of the feed in one embodiment and 0.005 to 0.01 wt. % in a second embodiment.

The surfactant can be at least one of anionic surfactants, zwitterionic surfactants, amphoteric surfactants, nonionic surfactants, cationic surfactants, and combinations thereof. In one embodiment, the non-ionic surfactant is selected from polyoxyethylenesorbitan monolaurate, polyoxyethylenated alkyphenols, polyoxyethylenated alkyphenol ethoxylates, and the like. Suitable cationic surfactants include quarternary long-chain organic amine salts, quarternary polyethoxylated long-chain organic amine salts, and the like. In another embodiment, the surfactant is selected from the group of solvent materials having a high surface tension property such as ethylene carbonate, benzophenone; benzyl cyanide, nitrobenzene, 2-phenylethanol, 1,3-propanediol, 1,4-butanediol, 1,5-pentanediol, diethyleneglycol, triethyleneglycol, glycerol, dimethyl sulfoxide (DMSO), N-methyl formamide, N-methylpyrrolidone, and mixtures thereof. In yet another embodiment, the surfactant comprises a surfactant having a high surface tension such as N-methyl pyrrolidone, which surfactant in some embodiments, helps enhance the conversion yield of at least 1%. Other examples of surfactants include acetonitrile, acetone, ethyl acetate, hexane, diethyl ether, methanol, ethanol, acetyl acetone, diethylcarbonate, chloroform, methylene chloride, diethyl ketone, and mixtures thereof.

In one embodiment, the surfactant is a cationic surfactant, e.g., a water-soluble cationic amine selected from the group of cetyl trimethyl ammonium bromide, cetyl trimethyl ammonium chloride, dodecyl trimethyl ammonium amine, nonyl trimethyl ammonium chloride and dodecyl phenol quaternary amine soaps.

In one embodiment, the surfactant is an organic compound containing at least one nitrogen atom or phosphorous for a catalyst with a carbosulfide phase with enhanced catalytic activities. The amount of the N-containing/P-containing/sulfur-containing organic additive to be added generally depends on the desired activity of the final catalyst composition.

In another embodiment, the surfactant is an ammonium or phosphonium of the formula $R_1R_2R_3R_4Q+$, wherein Q is nitrogen or phosphorous and wherein at least one of $R_1$, $R_2$, $R_3$, $R_4$ is aryl or alkyl of 8-36 carbon atoms, e.g., —$C_{10}H_{21}$, —$C_{16}H_{33}$ and —$C_{18}H_{37}$, or combinations thereof, the remainder of $R_1$, $R_2$, $R_3$, $R_4$ being selected from the group consisting of hydrogen, alkyl of 1-5 carbon atoms and combinations thereof. Examples cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidbdecylammonium. The compound from which the above ammonium or phosphonium ion is derived may be, for example, the hydroxide, halide, silicate, or mixtures thereof.

In one embodiment, the surfactant is an N-containing organic additive selected from the group of aromatic amines, cyclic aliphatic amines, polycyclic aliphatic amines, and mixtures thereof. In another embodiment, the N-containing organic additive is selected from compounds containing at least one primary, secondary, and/or tertiary amine group such as hexamethylenediamine, monoethanolamine, diethanolamine, triethanolamine and N,N-dimethyl-N'-ethylethylenediamine; amino alcohols, such as, for example, 2(2-amino ethyl amino)ethanol, 2(2-aminoethoxy)ethanol, 2-amino-1-butanol, 4-amino-1-butanol, 2,2-diethoxyethylamine, 4,4-diethoxybutylamine, 6-amino-1-hexanol, 2-amino-1,3-propanediol, 3-amino-1,2-propanediol, 3-amino-1-propanol; and Amino alkoxy-silanes, such as, for example, (3-glycidoxypropyl)trimethoxysilane, 3-(2-aminoethylamino) propyltrimethoxysilane and (3-aminopropyl)trimethoxy-silane, and mixtures thereof. In yet another embodiment, the surfactant is a sulfur-containing organic additive. In one embodiment, the surfactant is selected from the group of alkyl sulfonates, phosphonates, and alkyl oxides.

In one embodiment, the stabilizer/surfactant is an organic carboxylic acid surfactant. In one embodiment, the surfactant is citric acid. In another embodiment, the surfactant is pentadecanoic acid, decanoic acid, or other similar long chain acids. In yet another embodiment, the surfactant is alginic acid. In a fourth embodiment, the surfactant is maleic acid. In a sixth embodiment, the surfactant is pyrollodone and/or sulfonic acid, selected for their asphaltenes deagglomeration characteristics.

Optional Additives—Scavengers/Sacrificial Materials: In one embodiment, at least an additive selected from metal scavengers, metal contaminant removers, metal passivators, and sacrificial materials is added to the process, e.g., in the transformation stage or in-situ sulfiding stage, in an amount ranging from 1 to 5000 ppm (of the slurry catalyst). In a second embodiment, the additive material is added in an amount of less than 2,000 ppm. In a third embodiment, the additive material ranges from 50 to 1000 ppm.

In one embodiment, the optional additives primarily function as metal contaminant removers and/or metal passivators and/or metal scavengers, for removing heavy metals in the heavy oil feed. In another embodiment, some other sacrificial materials, besides functioning as a metal scavenger for absorbing metals, also absorb or trap other materials including deposited coke.

In one embodiment, the additive material can be added to the process as is, or in a suitable diluent or carrier solvent. Exemplary carrier solvents include but are not limited to aromatic hydrocarbon solvents such as toluene, xylene, and crude oil derived aromatic distillates. Exemplary diluents include vacuum gas oil, diesel, decant oil, cycle oil, and or light gas oil. In some embodiments, the additive material may be dispersed in a small portion of the heavy oil feedstock then added to the slurry catalyst.

In one embodiment, the additive material is a "sacrificial material" (or "trapping material") which functions to trap, or for the deposit of, and/or immobilization of deposited coke and/or metals (Ni, V, Fe, Na) in the heavy oil feed, mitigating the detrimental effects on these materials on the catalyst and/or equipment. In another embodiment, the additive material functions to immobilize/adsorb the asphaltenes in the heavy oil feedstock, thus mitigating catalyst deactivation. In one embodiment, the sacrificial material has large pores, e.g, having a BET surface area of at least 1 $m^2/g$ in one embodiment, at least 10 $m^2/g$ in a second embodiment, and at least 25 $m^2/g$ in another embodiment. In yet another embodiment, the additive material is a sacrificial material having a pore volume of at least 0.005 $cm^3/g$. In a second embodiment, a pore volume of at least 0.05 $cm^3/g$. In a third embodiment, a total pore volume of at least 0.1 $cm^3/g$. In a fourth embodiment, a pore volume of at least 0.1 $cm^3/g$. In one embodiment, the sacrificial material has a pore volume of at least 0.5 $cm^3/g$. In another embodiment, at least 1 $cm^3/g$.

In one embodiment, the sacrificial material comprises a large pore inert material such microspheres of calcined kaolin clay. In another embodiment, the sacrificial material is characterized by having at least 20% of its pore volume constituted by pores of at least 100 Angstrom; and 150-600 Angstrom in a second embodiment.

Examples of additive materials for use in trapping deposits/metal scavenging include but are not limited to silicate compounds such as $Mg_2SiO_4$ and $Fe_2SiO_4$; inorganic oxides such as iron oxide compounds, e.g., $FeO.Fe_2O_3$, FeO, $Fe_3O_4$, $Fe_2O_3$, etc. Other examples of additive materials include silicate compounds such as fume silica, $Al_2O_3$, MgO, $MgAl_2O_4$, zeolites, microspheres of calcined kaolin clay, titania, active carbon, carbon black, and combinations thereof. Examples of metal passivators include but are not limited to alkaline earth metal compounds, antimony, and bismuth.

In one embodiment, the additive material is a commercially available metal scavenger from sources such as Degussa, Albermale, Phosphonics, and Polysciences. In one embodiment, the metal scavenger is a macroporous organofunction polysiloxane from Degussa under the tradename DELOXANE™.

In one embodiment, the scavenger/trapping/scavenger material originates from a slurry catalyst, specifically, a spent slurry catalyst in a dry powder form. In one embodiment, the spent slurry catalyst is from a heavy oil upgrade system having at least 75% of the heavy oil removed using means known in the art, e.g., deoiling via membrane filtration, solvent extraction, and the like. The spent slurry catalyst for use as a sacrificial material in one embodiment has a BET surface area of at least 1 $m^2/g$ for the trapping of coke/metals that would otherwise deposit along the reactor internals. In a second embodiment, the spent slurry catalyst has a BET surface area of at least 10 $m^2/g$. In a third embodiment, the BET surface area is greater than 100 $m^2/g$.

In one embodiment, the additive is a scavenger/trapping/scavenger material originated from a spent deoiled slurry catalyst, wherein some or most of the metals have been removed. In one embodiment, the additive is in the form of dried spent slurry catalyst having at least some or most of the metals such as nickel, molybdenum, cobalt, etc., removed from the spent catalyst. In one embodiment, the sacrificial material is in the form of solid residue comprising coke and some group VB metal complex, such as ammonium metavanadate, which residue is obtained after most of the metals such as molybdenum and nickel have been removed in a pressure leaching process. In yet another embodiment, the sacrificial material is in the form of solid residue comprising primarily coke, with very little vanadium left (in the form of ammonium metavanadate).

In another embodiment, the sacrificial material is carbon black which is selected due to its high surface area, various pore size structure, and easy recovery/separation from heavy metals by combustion. Furthermore, the carbon material is relatively soft, thus minimizing damage on let down valves and other plant materials. In one embodiment, the carbon material can be any generally commonly known and commercially available material. Examples include but are not limited to porous particulate carbon solid characterized by a size distribution ranging from 1 to 100 microns and a BET surface area ranging from 10 to over 2,000 $m^2/g$. In one embodiment, the carbon material has an average particle size ranging from 1 to 50 microns and a BET surface area from about 90 to about 1,500 $m^2/g$. In another embodiment, the carbon material has an average particle size ranging from 10 to 30 microns.

Optionally, the catalyst material can be pretreated by one or more techniques as generally known in the art such calcination and/or impregnating first with the slurry catalyst prior to being fed into the upgrade system and/or mixed with the heavy oil feedstock.

In one embodiment, the additive material comprises activated carbon having large surface area, e.g., a pore area of at least 100 m$^2$/g, and a pore diameter range between 100 to 400 Angstrom. In one embodiment, the additive material is a commercially available powdered activated carbon from Norit as DARCO KB-G™ with a D-90 of 40 microns. In another embodiment, the commercially available carbon material is DARCO INSUL™ with a D-90 of 23 microns. In yet another embodiment, the additive material comprises carbon black obtained by the coking of spent slurry catalyst in heavy oil residual from a metal recovery process to recover/separate metals from a spent slurry catalyst.

In one embodiment, the additive material serves a plurality of function, e.g., deposit trapping/metal scavenging and antifoaming, deposit trapping/metal scavenging and mesophases suppressing, etc., with the use of a surface treated sacrificial material. In one embodiment, the sacrificial material is surface treated (or coated) with at least an additive material such as an inhibitor and/or an anti-foam agent.

In one embodiment, the additive material is surface-modified carbon black. In one embodiment, the surface treated carbon black contains reactive function groups on the surface that provide the anti-foam properties, and with the requisite surface area and pore size structure to trap and/or immobilize deposited coke and/or metals (Ni, V, Fe, Na) in the heavy oil feed. In one embodiment, the additive is a surface-treated carbon black, with the carbon having been brought into contact with a heavy oil additive, e.g., a silicone compound such as dialkyl siloxane polymers, polydimethyl siloxane, polydiphenyl siloxane, polydiphenyl dimethyl siloxane, fluorinated siloxanes, and mixtures thereof.

Solvent Carrier/Hydrocarbon Transforming Agent: In one embodiment of a water-based catalyst synthesis method, a hydrocarbon transforming agent is employed to transform a water-based catalyst precursor/metal precursor(s) to an oil based active catalyst (hydrophobic). In another embodiment, a hydrocarbon compound is used as a solvent carrier for mixing with the metal precursors, facilitating the dispersion of the precursor catalyst particles for a subsequent sulfidation step. In yet another embodiment, a hydrocarbon compound is used as the medium to thermally decompose a sulfur containing organic precursor, releasing at least some of the sulfur forming an oil based active catalyst. In yet another embodiment, water or an alcohol solution is used as a solvent carrier for dispersing inorganic metal precursors.

In one embodiment, the weight ratio of the "d" block element metals to solvent carrier/transforming agent is less than 1.0. In a second embodiment, the ratio is less than 0.5. In a third, less than 0.1. In one embodiment, the weight ratio of the catalyst precursor (or oil dispersible sulfur containing organic metal precursor) to a hydrocarbon compound for use as a solvent carrier/transforming agent is in the range of 1:10 to 5:1. In a second embodiment, the weight ratio is in the range of 1:5 to 1:1. In another embodiment, in the range of 1:2 to 1:15. In a third embodiment, from 1:3 to 1:100. In a fourth embodiment, from 1:5 to 1:50. In a fifth embodiment, from 1:7 to 1:20.

If a hydrocarbon compound is used, it can generally include any hydrocarbon compound, acyclic or cyclic, saturated or unsaturated, unsubstituted or inertly substituted, and mixtures thereof, and which hydrocarbon compound is liquid at ordinary temperatures. In one embodiment, the hydrocarbon compound is selected from the group of straight chain saturated acyclic hydrocarbons as octane, tridecane, eicosane, nonacosane, or the like; straight chain unsaturated acyclic hydrocarbons as 2-hexene, 1,4-hexadiene, and the like; branched chain saturated acyclic hydrocarbons as 3-methylpentane, neopentane, isohexane, 2,7,8-triethyldecane, and the like; branched chain unsaturated acyclic hydrocarbons such as 3,4-dipropyl-1,3-hexadiene-5-yne, 5,5-dimethyl-1-hexene, and the like; cyclic hydrocarbons, saturated or unsaturated, such as cyclohexane, 1,3-cyclohexadiene, and the like; and including such aromatics as cumene, mesitylene, styrene, toluene, o-xylene, or the like.

In one embodiment, the transforming agent is selected from petroleum hydrocarbons characterized as virgin naphthas, cracked naphthas, Fischer-Tropsch naphtha, vacuum gas oil (VGO), light cat cycle oil, heavy cat cycle oil, typically those containing from about 5 to about 30 carbon atoms, and mixtures thereof. In one embodiment, the hydrocarbon compound is VGO. In yet another embodiment, the hydrocarbon compound is methanol. In one embodiment, the hydrocarbon compound has a kinetic viscosity ranging from 2 cSt to 15 cSt @ 10$^{o o}$ C. In a second embodiment, the hydrocarbon oil as a transforming agent has a kinematic viscosity of at least 2 cSt at 10$^{o o}$ C. In a third embodiment, from 5 cSt to 8 cSt at 10$^{o o}$ C. In one embodiment with the kinematic viscosity of the transforming agent being below 2 cSt @ 10$^{o o}$ C. or above about 15 cSt @ 10$^{o o}$ C., the transformation of the catalyst precursor results in catalyst particles agglomerating or otherwise not mixing.

In one embodiment, the solvent carrier is selected from the group of alcohol solutions, e.g., methanol, ethanol, and the like. In another embodiment, the solvent carrier is water with optional addition of at least a surfactant in an amount of less than 20 wt. %. In a third embodiment, the solvent carrier is selected from the group of aldehydes, citric acid, carboxylic acids, and ketones. In one embodiment, the solvent carrier is acetone.

Other Optional Components: If desired, materials including other metals can be added in addition to the components described above. These materials include any material that is added during conventional hydroprocessing catalyst preparation. Suitable examples are phosphorus compounds, boron compounds, additional "d" block metals, lanthanoid metals R or mixtures thereof. Suitable phosphorus compounds include ammonium phosphate, phosphoric acid, or organic phosphorus compounds. Suitable additional metals that can be added to the process steps include are, e.g., rhenium, ruthenium, rhodium, iridium, platinum, palladium, etc. In one embodiment, the additional metals are applied in the form of water-insoluble compounds. In another embodiment, the additional metals are added in the form of water soluble compounds. In another embodiment, additional lanthanoid metal compounds are added in the form of oil soluble compounds, e.g., neodymium carboxylates such as neodymium neodecanoate, neodymium naphthenate, neodymium octanate, neodymium 2,2-diethylhexanoate, neodymium 2,2-diethylheptanoate and the corresponding salts of lanthanum or praseodymium.

Apart from adding these metals during the process, it is also possible to composite the final catalyst composition with the optional materials. It is, e.g., possible to impregnate the final catalyst composition with an impregnation solution comprising any of these additional materials.

In one embodiment to help reduce coking, the additional optional component added is phosphorous in the form of phosphomolybdic acid having an atomic ratio of P to "d" block element metals ranging from about 0.08:1 to 0.01:1.

Method for Making Catalyst: In one embodiment, the preparation method allows systematic varying of the composition and structure of the catalyst by controlling the relative amounts of the elements, the types of the feed components (reagents) including surfactant additives if any, the length and severity of the various reactions. The method results in a fine dispersion of catalyst particles in the feed, e.g., heavy oil or coal, wherein it will do its chemistry under the appropriate process conditions.

In one embodiment wherein at least one of the metal precursors is an oil dispersible sulfur containing organic compound, e.g., a chelate compound with sulfur as a coordinating atom, and wherein there is sufficient sulfur for the metal precursors to be sulfided upon contact with a hydrocarbon oil, e.g., the heavy oil feedstock itself or VGO, a separate sulfiding step with a sulfiding agent is optional. Sulfiding upon contact with a hydrocarbon compound, in a hydroprocessing reactor or prior to introduction to a hydroprocessing reactor is sometimes referred to as "in-situ sulfiding." In one embodiment, the in-situ sulfiding is due to the thermal decomposition of the oil dispersible sulfur containing metal precursor.

In one embodiment, wherein both of the metal precursors are inorganic compounds and/or there is sufficient sulfur in the metal precursors (or the sulfur is not in a releasable form) for the precursors to be sulfided upon contact with a hydrocarbon oil, sulfiding with a sulfiding agent is needed to form at least a sulfided catalyst precursor. Sulfidation prior to contact with a hydrocarbon is sometimes referred to as "ex-situ sulfiding".

In one embodiment for a process with ex-situ sulfiding, the metal precursors are first combined forming an intermediate mixture, with the weight ratio of the two "d" element metals ranging from about 1:1 to about 1:100 in one embodiment. In a second embodiment, the ratio ranges from about 1:2 to 1:20. In a third embodiment, from 1:5 to 1:30. In a fourth embodiment, from 1:10 to 10:1. In one embodiment, the reaction time for the mixing ranges from about 1 hour to 10 hours, at a temperature ranging from room temperature to 100° C. at a pressure ranging from atmospheric to 3000 psig.

In one embodiment with one of the metal precursors being a sulfate, an aqueous solution of alkali metal hydroxide is optionally added to the mixing step to precipitate out the metal for subsequent sulfidation. In one embodiment, the metal precursor mixture may further comprise other promoter metal components, e.g., cobalt or chromium components. In one embodiment, the mixing (reaction) of metal precursors is carried out in an organic solvent with added water under $H_2$-containing gas pressure, with the organic solvent being a hydrocarbon mixture of alkanes and aromatic compounds.

In one embodiment, the metal precursor mixture is kept at its natural pH during the reaction step. The pH is in the range of 0-12 in one embodiment, between 2-10 in a second embodiment, and 3-8 in a third embodiment. Changing the pH can be done by adding base or acid to the reaction mixture, or adding compounds, which decompose upon temperature increase into hydroxide ions or $H^+$ ions that respectively increase or decrease the pH. Examples include urea, nitrites, ammonium hydroxide, etc. In one embodiment, the pH is controlled such that the pH at the beginning of the reaction differs from the final pH after precipitation.

In one embodiment after mixing, forming a precipitate, the metal precursor mixture is isolated from the liquid using methods known in the art such as filtration, centrifugation, decantation, or combinations thereof. In another embodiment, the precursor mixture is optionally treated with a sulfur additive or a commercially available catalyst presulfiding agent.

In one embodiment with ex-situ sulfiding, after mixing, the catalyst precursor mixture is sulfided with a sulfiding agent, e.g., ammonium sulfide $(NH_4)_2S$ for a period of time ranging from 5 minutes to 2 hours. In one embodiment, the catalyst precursor mixture is gradually added to a mixing tank already containing the sulfiding agent, e.g., ammonium sulfide in aqueous solution in excess relative to the metal salts for a more favorable condition for sulfidation.

In one embodiment, an aqueous solution of a Group VIB metal compound, e.g., ammonium p-tungstate or a molybdate such as ammonium molybdate, is optionally brought into contact with the sulfiding agent in the sulfidation step as a promoter. In one embodiment in addition to the sulfiding agent, at least a sulfur additive and optionally other additives known in the art, e.g., N-containing and/or P-containing organic additives, phosphorous-containing promoters, etc., can be separately or in a mixture with the sulfiding agent to increase the incorporation of sulfur in the catalyst. In one embodiment, instead of or in addition to the addition of surfactants in other steps, at least a surfactant is added in the sulfiding step.

In one embodiment, the sulfidation is carried out at a temperature ranging from room temperature to 70° C., and at 0 psig. In another embodiment, the sulfidation is carried out at a temperature ranging from room temperature to 300° F. and for ½ hr. to 24 hours. In another embodiment, the sulfidation is at 50° F. to 250° F. In yet another embodiment, the sulfidation is between 50-200° F. In a fourth embodiment, the sulfidation is between 60-150° F. In one embodiment, the sulfidation is at between 0 to 3000 psig. In a second embodiment, between 100 to 1000 psig. In a third embodiment, the sulfidation pressure is less than 500 psig.

In yet another embodiment, the sulfidation is carried out at a temperature ranging from 50° F. to 300° F., from 10 minutes to 5 days, and under a $H_2$-containing gas pressure. If the sulfidation temperature is below the boiling point of the sulfiding agent, such as 60-70° F. in the case of ammonium sulfide solution, the process is generally carried out at atmospheric pressure. Above the boiling temperature of the sulfiding agent/optional components, the reaction is generally carried out at an increased pressure, as in an autoclave.

The hydrogen containing gas in the above steps of the process can be substantially pure hydrogen, or can be mixtures of hydrogen with other gases such as nitrogen, helium, methane, ethane, carbon monoxide or hydrogen sulfide.

In one embodiment, the sulfidation is with an aqueous ammonium sulfide solution at a temperature between ambient and 250° F., and in the presence of at least a sulfur additive selected from the group of thiodazoles, thio acids, thio amides, thiocyanates, thio esters, thio phenols, thiosemicarbazides, thioureas, mercapto alcohols, and mixtures thereof.

In one embodiment with the sulfiding step being carried out in aqueous solution, the resultant product of the sulfiding step is a slurry in an aqueous solution. Analyses will show that the catalyst precursor product of the sulfiding step is catalytically active, although not in optimum form for use in hydroprocessing operations.

In one embodiment, the process can be extended to include blending metal sulfide powders, e.g., molybdenum sulfide powders, into the catalyst precursor to further enhance the activity of the catalyst.

In one embodiment before sulfiding, the catalyst precursor is optionally isolated from the liquid using methods known in the art such as filtration, centrifugation, decantation, or combinations thereof, under an inert atmosphere comprising any of nitrogen, refinery gas, a gas having little or no oxygen, and mixtures thereof. In the next step, the catalyst precursor powder is impregnated with the sulfiding agent, e.g., ammonium sulfide (NH$_4$)$_2$S solution, and/or optional sulfur additives.

In one embodiment after sulfiding, the catalyst precursor is subject to an optional ammonia removal step. Ammonia removal has a favorable effect upon catalyst activity because ammonia is a depressant to the activity of a hydrogenation catalyst. Ammonia removal is beneficial to catalyst activity because any ammonia present can be adsorbed at metal sites and may constitute a catalyst poison. In one embodiment, the sulfided water based slurry from the sulfiding step is subject to a simple aqueous phase ammonia flashing step by cooling and depressurizing the slurry stream. Ammonia can be flashed off together with any generated hydrogen sulfide and hydrogen present in the system.

In one embodiment prior to or after the sulfidation step, the mixture is optionally treated with at least an N-containing/P-containing organic additive. In yet another embodiment, a surfactant is added to the sulfidation step (either before, after, or during) to improve dispersion.

In one embodiment with ex-situ sulfiding, the sulfided catalyst precursors are mixed with a hydrocarbon compound and transformed into an oil based catalyst of the forumula $(R^p)_i(M^t)_a(L^u)_b(S^v)_d(C^w)_e(H^x)_f(O^y)_g(N^z)_h$. In one embodiment with in-situ sulfiding, the metal precursors are mixed with a hydrocarbon compound in the transformation step, under conditions sufficient for the metal precursors to thermally decompose, forming a sulfided slurry catalyst in oil. In yet a third embodiment wherein the metal precursors themselves are reagent-grade sulfide compounds, the transformation step is optional as the sulfide compounds can be combined and added directly to the heavy oil feedstock.

The hydrocarbon oil for use in the transformation step can be a light oil such as naphtha (with a boiling point above the boiling point of water), wherein after the transformation step, the light oil can be conveniently vaporized in order to obtain the concentrated slurry catalyst. The vaporized oil can be recycled for subsequent reuse in the catalyst transformation step or elsewhere in the hydroprocessing system. Additionally, with the use of a light oil as a transforming agent, there is less agglomeration and the concentrated slurry catalyst can be subsequently quickly dispersed into heavy oil feed in a hydroconversion process. In one embodiment, the hydrocarbon oil for use in the transformation step is selected from the group of decant oil, diesel, VGO (vacuum gas oil), light gas oil, MCO (medium cycle oil), light cycle oil (LCO), heavy cycle oil (HCO), solvent donor, and other aromatic solvents. In a third embodiment, the hydrocarbon oil for use in the transformation step is a heavy oil feedstock.

In one embodiment with a water-based sulfide catalyst precursor, it is believed that in the transformation process, the hydrophilic sulfide catalyst precursor is transformed into an active hydrophobic sulfide species in the form of fine dispersion of small aggregates. In one embodiment, the process conditions in the transformation step are sufficient to form the final catalyst, in terms that at least a portion of the water is in the liquid. In one embodiment, "a portion of the water" means that at least 50% of the water in the mixture is maintained in a liquid phase. In a second embodiment, "a portion of the water" means that less than 90% of the water in the mixture is maintained in the liquid phase. In a third embodiment, less than 70% of the water in the mixture is maintained in the liquid phase. In a fourth embodiment, less than 50% of the water is maintained in the liquid phase.

In one embodiment, the transformation is carried out at a temperature ranging from 100-400° C. and at a pressure of 0-1000 psig. In yet another embodiment, the temperature of the transformation step is maintained at a temperature of 50-600° F. In a second embodiment, the temperature is maintained at a temperature of 100-500° F. In a third embodiment, the transformation temperature ranges from 150-450° F. In a fourth embodiment, the transformation temperature ranges from 200 to 475° C. In one embodiment, the pressure of the transformation step is maintained in the range of 0-1000 psig. In a second embodiment, it is between 200-500 psig. In a third embodiment, from 300-450 psig.

In one embodiment, the residence time in the transformation step ranges from 30 minutes to 3 hours. In another embodiment, the residence time ranges from 1 to 2 hrs. In one embodiment, mixing is via a CSTR with high shear mixing of greater 500 RPM ("Revolutions Per Minute") to maintain homogenous slurry in the reactor. In one embodiment, instead of or in addition to the addition of surfactants in other steps, at least a surfactant is added to the catalyst precursor and hydrocarbon compound in this transformation phase.

In one embodiment, it is desirable to remove water from the catalyst slurry after the transformation because it might interfere with the reactivity of the catalyst. In one embodiment, hydrogen is added directly to the transformation step (to the mixing tank). In another embodiment, hydrogen is added to a high pressure separator to flash off water and residual H$_2$S in the catalyst slurry. The addition of hydrogen helps change water from liquid to vapor phase, permitting separation from oil slurry in a high pressure separator. In one embodiment, hydrogen is added at a rate from 300 to about 2000 SCFB. In one embodiment, the amount of water remaining in the slurry catalyst is less than 10 wt. %. In a second embodiment, less than 5 wt. %. In a third embodiment, between 1 to 3 wt. %.

In one embodiment (not shown), the active catalyst composition is transported to a storage tank, wherein the catalyst slurry is continuously mixed to maintain a homogenous slurry in a hydrogen atmosphere with little or no oxygen to maintain catalytic activity and stability Ammonia removal from the oil based catalyst slurry can be carried out after the transformation step in one embodiment. The catalyst stream in one embodiment is heated prior to depressurization and ammonia vaporization.

In one embodiment, instead of combining the metal precursor components for subsequent sulfidation, the metal precursor components are sulfided separately in two separate sulfiding steps, then combined together for the subsequent transformation step into an oil dispersible catalyst slurry. In another embodiment, one of the metal precursors is first sulfided, then combined with the other (unsulfided) metal precursor for the transformation step. In a third embodiment, a sulfided metal precursor or an oil dispersible chelated organic metal precursor with sulfur as a coordinating atom is combined with a second (unsulfided) metal precursor and a hydrocarbon oil component for an in-situ sulfidation, generating slurry catalyst.

In one embodiment after the transformation step, the slurry catalyst in oil is further reduced in particle size with a mulling or milling step (not shown), using commercially available equipment, for reducing the average catalyst particle size to less than 20 microns in one embodiment, and less than 10 microns in a second embodiment.

In one embodiment, the sulfiding can be carried out in-situ in a hydroprocessing reactor with the reaction of the precursors and the sulfiding agent (e.g., elemental sulfur or a sulfur-containing compound) occurring in the hydrocarbon feedstock itself. In one embodiment, the in-situ sulfiding is carried out in a mixture of hydrocarbon feedstock and additional hydrocarbon feed, e.g., VGO (vacuum gas oil), naphtha, MCO (medium cycle oil), light cycle oil (LCO), heavy cycle oil (HCO), solvent donor, or other aromatic solvents, etc., in an amount ranging from 2 to 50 wt. % of the heavy oil feed. In yet another embodiment, the in-situ sulfiding is carried out with a solid hydrocarbon feedstock, e.g., coal, in a solvent in a coal liquefaction reactor.

The in-situ sulfiding in one embodiment is carried out under hydroprocessing conditions, e.g., at a temperature ranging from 200 to 500° C. and a pressure from 3 to 300 bar. In another embodiment, the in-situ sulfiding is carried out in two-stages, with the first stage being at ambient pressure and temperature, and the second stage under hydroprocessing conditions.

In one embodiment before the in-situ sulfiding in a hydroprocessing reactor, an alcohol solution is used as a carrier/diluent for the mixing/dispersing of the metal precursors prior to the in-situ sulfidation. In yet another embodiment, the sulfiding is carried out ex-situ either in a separate step after metal precursors are dispersed in an alcohol solution, or directly in one step with the sulfiding agent being added directly to the alcohol solution and the metal precursors.

In one embodiment for a coal liquefaction catalyst for the conversion of solid hydrocarbon feedstock (i.e., carbonaceous materials) with the use of inorganic metal precursors, a carrier solvent is used as a diluent for the mixing/dispersing of the metal precursors, forming a catalyst precursor. The carrier solvent can be any of alcohol solution, ketones, citric acid, carboxylic acids, or even water. In the next step, the solvent carrier/catalyst precursor mixture is used to spray/wet/impregnate carbonaceous particles. The impregnated carbonaceous particles are optionally dried to remove the solvent carrier. The carbonaceous material can be any heteroatom-containing solid carbonaceous material or feed, as well as any heavy hydrocarbon feed, such as, for example, coal, coke, peat, shale oil and/or a similar material, having an average particle size of less than about 0.5 inches. In one embodiment, the term "impregnation" (or impregnate) means incipient wetness, e.g., the filling of the pores of the carbonaceous particle with the catalyst precursor/solvent mixture.

In the coal liquefaction reaction, the coal particles are mixed with a solvent and a sulfidation agent, wherein the catalyst precursor is transformed into a catalyst of the formula $(R^p)_i(M^t)_a(L^u)_b(S^v)_d(C^w)_e(H^x)_f(O^y)_g(N^z)_h$. In one embodiment, the solvent is hydrocarbon compound with a boiling point of greater than 300° F. (149° C.), e.g., VGO, FCC type process oil and the like. The in-situ sulfiding in one embodiment is carried out in a coal liquefaction process at a temperature of at least 200° C. and a pressure in the range of 300-5000 psig for at least 10 minutes. In one embodiment, the in-situ sulfidation is carried out in two stages, with the first stage being at a lower temperature (e.g., ambient temperature) and pressure (e.g., ambient) than the second stage of coal liquefaction, with the second stage at a temperature of at least 350° C.

Reference will be made to FIGS. 1-9 to further illustrate embodiments of process to make the catalyst composition.

FIG. 1 illustrates the steps involved in an embodiment for preparing the catalyst composition with a sulfiding step, wherein at least one of the metal precursors is an inorganic compound or that the metal precursors do not contain sufficient sulfur, so a sulfidation step is needed.

In a reactor (mixing tank) 10, an metal precursor such as $Fe(NO_3)_3$, $FeSO_4$, $Zn(NO_3)_2$ or $ZnSO_4$ in aqueous solution (feed stream 1) is mixed with another inorganic or organic metal precursor (feed stream 2), forming an intermediate mixture. In one embodiment, the reaction time in the mixing tank 10 ranges from about 1 hour to 10 hours, the temperature ranges from room temperature to 100° C., and the pressure ranges from atmospheric to 3000 psig. In one embodiment, the weight ratio of the two "d" element metals in the two feed streams ranges from about 1:1 to about 1:200. In a second embodiment, the ratio ranges from about 1:2 to 1:20. In a third embodiment, from 1:5 to 1:30.

As shown, the metal precursor mixture is sulfided in reactor 20 in either batch or continuous mode, then transformed into an oil-soluble catalyst slurry in oil in mixing tank 30. In one embodiment as shown, the catalyst slurry is mixed with a heavy oil feedstock and preheated in mixing tank 40. In another embodiment (not shown), the catalyst slurry is pre-conditioned with hydrogen, prior to being fed to an upgrade system along with the heavy oil feed.

It is noted that equipment 10 (or 20) does not necessarily have to be a mixing tank. Additionally, that the metal precursors M and L do not necessarily have to be in a liquid form. In one embodiment, the metal precursors M and L (in solid or liquid form) are fed directly into a fluidized bed reactor (instead of a mixing tank as shown) along with a sulfiding agent for the sulfidation to take place.

Figure 2:
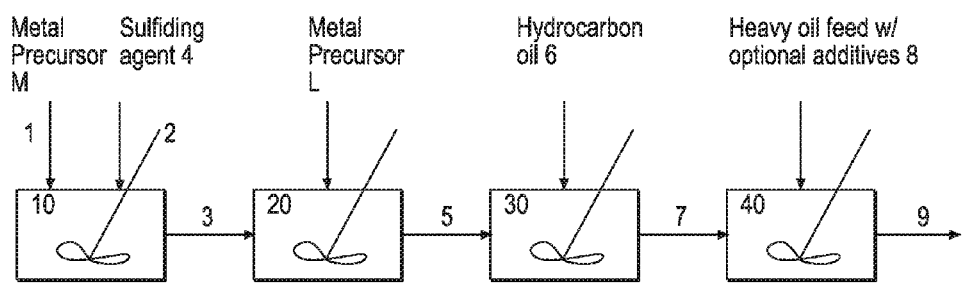
FIG. 2 illustrates a diagram of a second embodiment to prepare the catalyst composition with at least a sulfiding step.

FIG. 2 illustrates a diagram of a second embodiment to prepare the catalyst composition with a sulfiding step, wherein one of the metal precursors is first sulfided separately in reactor 10 prior to being combined with the second metal precursor L in tank 20 for a subsequent transformation step (in reactor 30). The metal precursors M and L can be organic or inorganic metal precursors, and any of the process steps can occur in either batch, continuous, or a combination of both.

Figure 3:
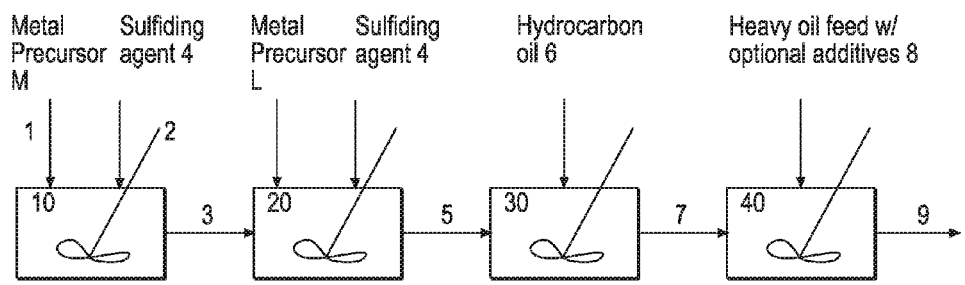
FIG. 3 illustrates the steps involved in another embodiment to prepare the catalyst composition with the metal precursors being sulfided separately.
Figure 4:
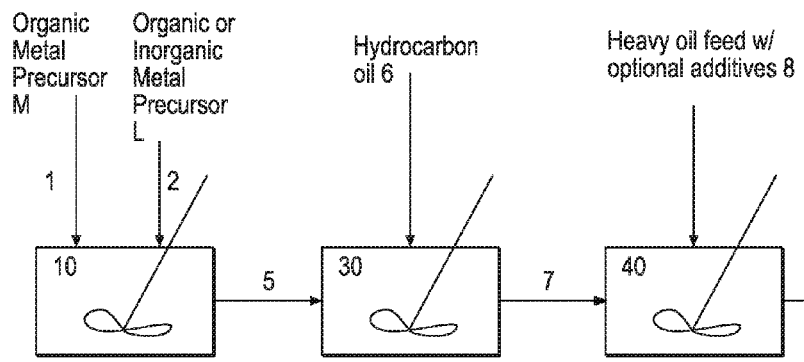
FIG. 4 illustrates the steps involved in one embodiment for preparing the catalyst composition wherein the sulfidation takes place in the transformation step.

FIG. 3 illustrates another embodiment of the process, wherein the metal precursors are sulfided separately in reactors 10 and 20 respectively. The sulfided catalyst precursors can be first combined before the transformation step, or they can be fed into reactor 30 separately (not shown) with a hydrocarbon diluent for the transformation step. FIG. 4 illustrates the steps involved in yet one embodiment, wherein the sulfiding is in-situ with the thermal degradation of at least a metal precursor, e.g., an oil dispersible sulfur containing organic compound such as zinc dibenzyldithiocarbamate, iron (III) dimethyldithiocarbamate, etc. The metal precursors are first combined in mixing tank 10 prior to the in-situ sulfidation step in reactor 30, wherein the precursors are combined with a hydrocarbon oil and decomposed, releasing sulfur upon thermal decomposition. The excess sulfur generated in the decomposition functions as a sulfiding agent for the in-situ sulfiding of the metal precursors in the mixture, forming a slurry catalyst composition 7 for subsequent heavy oil upgrade in hydroprocessing reactor 40.

Figure 5:
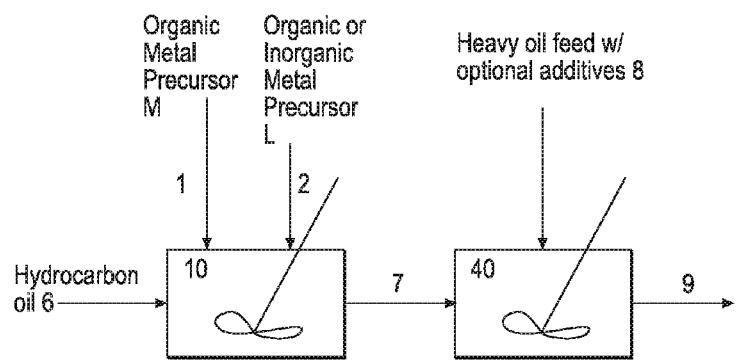
FIG. 5 illustrates the steps involved in another embodiment for preparing the catalyst composition wherein the sulfidation takes place in-situ, upon contact with a hydrocarbon compound.

FIG. 5 is another embodiment of the in-situ sulfiding, wherein the precursors 1 and 2 are combined directly with a hydrocarbon diluent 6 in mixing tank 10. In this embodiment, at least one of metal precursors is an oil dispersible sulfur containing organic compound, e.g., iron(III) dimethyldithio-carbamate (Fe-DTC), zinc diethyldithio-carbamate (Zn-DTC), zinc diisopropyldithiophosphate, etc. with readily releasable sulfur for the sulfidation of the metal precursors in-situ. The condition of the mixing tank 10 is maintained such that the oil dispersible sulfur containing metal precursor (s) thermally decompose, forming metal sulfides, for a catalyst slurry 7 of formula $(R^p)_i(M^t)_a(L^u)_b(S^v)_d(C^w)_e(H^x)_f(O^y)_g(N^z)_h$.

Figure 6:
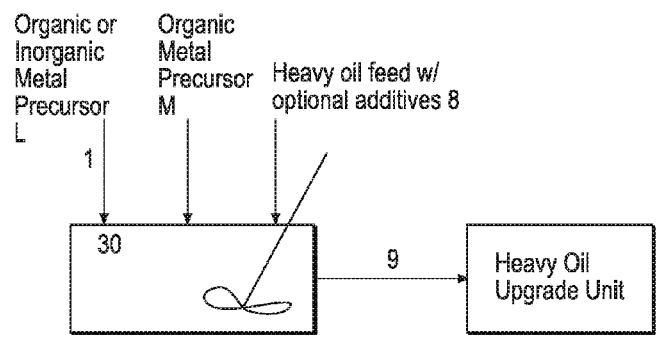
FIG. 6 illustrates yet another one embodiment for preparing the catalyst composition wherein the sulfidation takes place in-situ upon contact with a heavy oil feed.

FIG. 6 illustrates yet another one embodiment for preparing the catalyst composition wherein the sulfidation takes place in-situ upon contact directly with a heavy oil feed 8, with at least one of the metal precursors is an oil dispersible sulfur containing organic compound with readily releasable sulfur. In one embodiment, both of the metal precursors are soluble sulfur containing organic compounds. In a second embodiment, at least one of the metal precursors is a soluble sulfur containing organic compound with excess releasable sulfur. In yet another embodiment, both of the metal precursors are reagent-grade metal sulfides, wherein the metal sulfides combine and react upon contact with the heavy oil feedstock, forming a catalyst slurry of formula $(R^p)_i(M^t)_a(L^u)_b(S^v)_d(C^w)_e(H^x)_f(O^y)_g(N^z)_h$.

Figure 7:
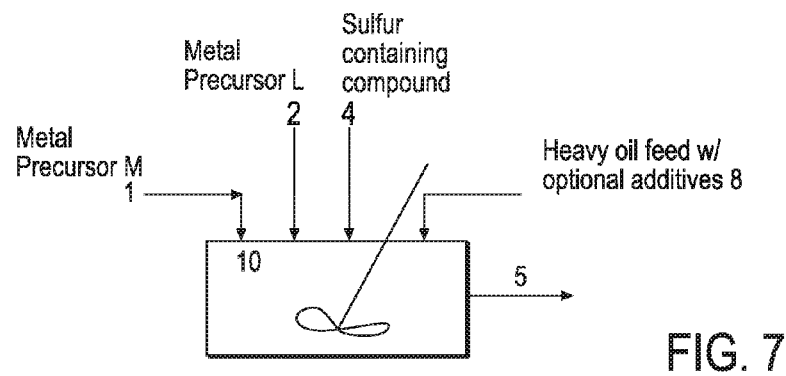
FIG. 7 illustrates one embodiment for preparing the catalyst composition wherein the sulfidation takes place in-situ upon contact with a heavy oil feed and a sulfiding agent.

FIG. 7 illustrates yet another one embodiment for in-situ sulfiding with at least one of the precursors is an organic metal precursor, e.g., iron/zinc dithiocarbamates. The sulfidation of the metal precursors takes place in-situ in the hydroprocessing reactor 10, upon contact with a heavy oil feed 8 and a sulfiding agent 4, e.g., a sulfur containing compound or elemental sulfur. In this embodiment, the heavy oil feed 8 transforms the precursors into a catalyst for use in the upgrade of the heavy oil into lighter products.

Figure 8:
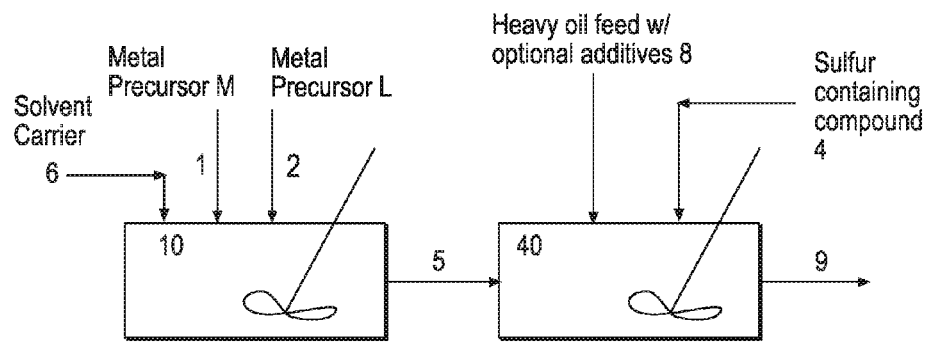
FIG. 8 illustrates another one embodiment for preparing the catalyst composition with the use of an alcohol solution as a carrier and with the sulfidation takes place in-situ upon contact with a heavy oil feed and a sulfiding agent.

In FIG. 8, a solvent carrier 6 is used for the dispersing of a mixture of metal precursors 1 and 2 forming a catalyst precursor. In one embodiment, at least one of the metal precursors is an organic compound. The solvent carrier in one embodiment is an alcohol solution. The sulfidation of the catalyst precursor 5 takes place in the hydroprocessing reactor 40, upon contact with a heavy oil feed 8 and a sulfiding agent 4. In this embodiment, the catalyst precursor is sulfided and decomposes in-situ, forming a catalyst slurry of formula $(R^p)_i(M^t)_a(L^u)_b(S^v)_d(C^w)_e(H^x)_f(O^y)_g(N^z)_h$.

Figure 9:
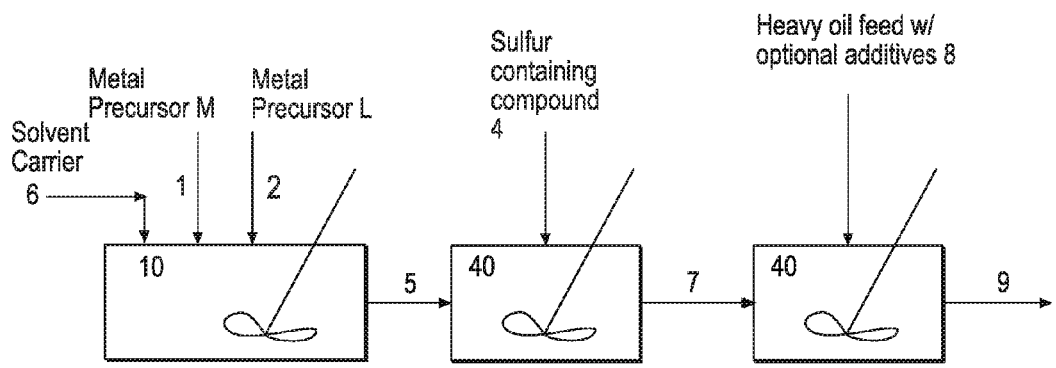
FIG. 9 illustrates yet another one embodiment for preparing the catalyst composition with the use of an alcohol solution, and wherein the catalyst precursor mixture is sulfided ex-situ forming a catalyst slurry prior to being use for a heavy oil upgrade process.

In FIG. 9, a hydrocarbon compound such as an alcohol solution 6 is used as the carrier for the mixture of metal precursors 1 and 2, then the catalyst precursor is sulfided in tank 40, forming a catalyst slurry 7 of formula $(R^p)_i(M^t)_a(L^u)_b(S^v)_d(C^w)_e(H^x)_f(O^y)_g(N^z)_h$ for subsequent use to upgrade a heavy oil feed 8 in hydroprocessing reactor 40. In this process, at least one of the metal precursors is an organic compound.

In any of the above embodiments as illustrated, the steps described are in no way limited to the use of any particular apparatus. The apparatuses are in no way limited to the equipment as shown in the Figures. Depending on the step, the apparatus can be any of a ebullating bed reactor, a mixing tank, or a fluidized bed reactor. It should be noted that the process can be carried out in any of continuous, batch mode, or combinations thereof for some of the steps, using a single-stage reactor or multiple-stage reactors. In another embodiment, some of the steps are done in batch mode, and some of the steps are done in the continuous mode. In one embodiment, sulfiding is done in a continuous mode. In one embodiment, the process is carried out as a batch process with a single reactor being used for the steps, e.g., forming a mixture, sulfiding, and forming an oil-soluble catalyst in the same equipment, with the steps being carried out in sequence after the completion of the previous step.

In another embodiment, the process is a batch process with multiple reactors in series and with each step being carried out in a separate CSTR. In a third embodiment, the process is continuous with the precipitate or catalyst precursor effluents from one step being moved to the next step in the process. Any of the mixing tanks or reactors can be in the form of continuously stirred tank reactors (CSTRs), and can be a vessel equipped heating means having a mechanical stirrer, or a static mixer, or by means of a recirculating pump. The components (feed streams) can be introduced simultaneously, or sequentially in any order to the reactor. The term "feed stream" refers to both continuous and batch processed.

The mixing of the components can be done within a continuous stirred tank, or it can be done by other means including an in-line static mixer (e.g., with a plurality of internal baffles or other elements), a dynamic high-shear mixer (vessel with propeller for very high turbulent, high shear mixing), or a combination of the above for turbulent mixing condition. In one embodiment, high shear mixing is desirable to prevent the aqueous slurry from settling or forming thick gel. As used herein, turbulent mixing conditions means sufficient mixing for a flow with a Reynolds number of at least 2000. In one embodiment, the mixing is continuous in a high shear mode, e.g., from 100 to 1600 RPM, and from about 10 minutes to 24 hours, forming a homogeneous slurry. In a second embodiment, turbulent mixing means sufficient mixing for a Reynolds number of at least 3000. In a third embodiment, a Reynolds number ranging from 3200 to 7200.

In one of the above embodiments, the mixing can be under an inert atmosphere comprising any of nitrogen, refinery gas, a gas having little or no oxygen, and mixtures thereof. In one embodiment, the mixing is under a $H_2$-containing gas pressure. In another, hydrogen gas is added at a relatively low rate before and after the reactor in which the hydrocarbon/catalyst precursor mixing takes place. In one embodiment, the $H_2$ flow to the transformation step is kept at 100 to 2000 SCFB (per hydrocarbon compound feed to the reactor). In a second embodiment, the $H_2$ flow ranges from 300 to 1000 SCFB. In a third embodiment, the $H_2$ flow ranges from 200 to 500 SCFB.

In any of the above embodiments, the metal precursor feed streams can be added to the reaction mixture in solution, suspension or as such. If soluble salts are added as such, they will dissolve in the reaction mixture and subsequently be precipitated. In one embodiment, the solution is heated optionally under vacuum to effect precipitation and evaporation of the water. In one embodiment, in addition to the metal precursors, at least a binder material and/or sacrificial material can be optionally added to the mixture. Binder material can be any of the optional binders described above and/or a precursor thereof. If a precursor binder material is added in the form of the solution, process condition can be adjusted so that precipitation of the binder may occur.

In one embodiment (not shown), at least a surfactant is added to the process before, after, or during the steps, e.g., sulfiding, transformation, etc. In one embodiment (not shown), the slurry catalyst mixture is subject to activation radiation to further improve the catalyst characteristics. In another embodiment, the mixture is subject to high intensity ultrasound treatment or electromagnetic energy to reduce the particle size and thus the catalyst characteristics.

The resultant slurry mixture can go directly to a hydroprocessing reactor without the need for water removal, but the presence of water will take up unnecessary room in a hydroprocessing reactor. In one embodiment, the oil based catalyst slurry mixture is passed to high pressure separator (not shown) to remove water from the slurry catalyst prior to entering a hydroprocessing reactor. In another embodiment, the oil based catalyst slurry is pre-conditioned with hydrogen (not shown) prior to entering a hydroprocessing reactor.

Use of The Catalyst: The catalyst composition is useful for upgrading carbonaceous feedstocks which include atmospheric gas oils, vacuum gas oils (VGO), deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulfurization, hydrodenitrification, and hydrodemetalization. In yet another embodiment, the slurry catalyst can also be used for pretreating a carbonaceous material and/or for liquefying a carbonaceous material such as coal.

In one embodiment of coal liquefaction, a catalyst precursor is used to impregnate ground coal at a rate of 0.25 to 5 wt. % of metal to coal (on a dry, ash-free basis or "daf" basis). After impregnation, the catalyst is formed via in-situ sulfidation. In one embodiment, the in-situ sulfidation is carried out by mixing elemental sulfur with the catalyst impregnated coal and a solvent or diluent, e.g., FCC-type process oil, at a solvent to coal ratio ranging from 0.25:1 to 5:1 in one embodiment, and 0.5 to 3:1 in a second embodiment.

The catalyst composition can be used to treat a plurality of feeds under wide-ranging reaction conditions such as temperatures of from 200 to 500° C., hydrogen pressures of from 5 to 300 bar (72 to 4351 psi or 0.5 to 30 MPa), liquid hourly space velocities of from 0.05 to 10 $h^{-1}$ and hydrogen treat gas rates of from 35.6 to 2670 $m^3/m^3$ (200 to 15000 SCF/B).

In one embodiment, the process pressure ranges from about 10 MPa (1,450 psi) to about 25 MPa (3,625 psi), about 15 MPa (2,175 psi) to about 20 MPa (2,900 psi), less than 22 MPa (3,190 psi), or more than 14 MPa (2,030 psi). The liquid hourly space velocity (LHSV) of the feed will generally range from about 0.05 $h^{-1}$ to about 30 $h^{-1}$, about 0.5 $h^{-1}$ to about 25 $h^{-1}$, about 1 $h^{-1}$ to about 20 $h^{-1}$, about 1.5 $h^1$ to about 15 $h^{-1}$, or about 2 $h^{-1}$ to about 10 $h^{-1}$. In some embodiments, LHSV is at least 5 $h^{-1}$, at least 11 $h^{-1}$, at least 15 $h^{-1}$, or at least 20 $h^{-1}$. In another embodiment, the LHSV ranges from 0.25 to 0.9 $h^{-1}$. In yet another embodiment, the LHSV ranges from 0.1 to 3 LHSV. The (contacting zone) process temperature ranges from about 410° C. (770° F.) to about 600° C. (1112° F.) in one embodiment, less than about 462° C. (900° F.) in another embodiment, more than about 425° C. (797° F.) in another embodiment.

The hydroprocessing can be practiced in one or more reaction zones and can be practiced in either countercurrent flow or co-current flow mode. By countercurrent flow mode is meant a process wherein the feed stream flows countercurrent to the flow of hydrogen-containing treat gas. The hydroprocessing also includes slurry and ebullated bed hydrotreating processes for the removal of sulfur and nitrogen compounds and the hydrogenation of aromatic molecules present in light fossil fuels such as petroleum mid-distillates, e.g., hydrotreating a heavy oil employing a circulating slurry catalyst.

The feeds for use in hydroprocessing processes using the catalyst may include petroleum and chemical feedstocks such as olefins, reduced crudes, hydrocrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Specific examples range from the relatively light distillate fractions up to high boiling stocks such as whole crude petroleum, reduced crudes, vacuum tower residua, propane deasphalted residua, brightstock, cycle oils, FCC tower bottoms, gas oils including coker gas oils and vacuum gas oils, deasphalted residua and other heavy oils. In one embodiment, the feedstock is a $C_{10+}$ feedstock. In another the feedstock is selected from distillate stocks, such as gas oils, kerosenes, jet fuels, lubricating oil stocks boiling above 230° C., heating oils, hydrotreated oil stock, furfural-extracted lubricating oil stock and other distillate fractions whose pour point and viscosity properties need to be maintained within certain specification limits.

In one embodiment, the feedstocks contain a substantial amount of nitrogen, e.g. at least 10 wppm nitrogen, in the form of organic nitrogen compounds. The feeds can also have a significant sulfur content, ranging from about 0.1 wt. % to 3 wt. %, or higher. In yet another embodiment, the feedstock is a feed derived from crude oils, shale oils and tar sands as well as synthetic feeds such as those derived from the Fischer-Tropsch process, having initial boiling points of greater than 315° C. or higher. Specific examples include reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax, and mixtures thereof. In one embodiment, the feedstock is a mixture of gas oil from a coker and vacuum distillation from conventional crudes, derived from distillation towers (atmospheric and vacuum), hydrocrackers, hydrotreaters and solvent extraction units, and may have wax contents of up to 50% or more. In yet another embodiment, the feed stock is selected from mid-distillates from fossil fuels such as light catalytic cycle cracking oils (LCCO); distillates derived from petroleum, coal, bitumen, tar sands, or shale oil; heavy catalytic cracking cycle oils (HCCO), coker gas oils, oils derived from recycled oil wastes and polymers, vacuum gas oils (VGO) and heavier resids, which contain several percent 3+ ring aromatics, particularly large asphaltenic molecules.

The hydrotreating processes using the catalyst may be suitable for making lubricating oil basestocks meeting Group II or Group III base oil requirements. In one embodiment, the catalyst is for use in a hydroprocessing process producing white oils. White mineral oils, called white oils, are colorless, transparent, oily liquids obtained by the refining of crude petroleum feedstocks.

The catalyst can be applied in any reactor type. In another embodiment, two or more reactors containing the catalyst may be used in series or running in parallel.

In one embodiment, the catalyst is added to the feedstock (catalyst to oil ratio) at a rate of 0.01 to 3 wt. % active "d" block element metals ("M" and "L" in the formula $(R^p)_i(M^t)_a(L^u)_b(S^v)_d(C^w)_e(H^x)_f(O^y)_g(N^z)_h$. In a second embodiment, at a rate of 0.25 to 2 wt. %. In a third embodiment, at a rate of 100 to 2000 ppm. In a fourth embodiment, the catalyst is added to the feedstock at a sufficient rate for the total amount of M and L in the reaction zone reaches 0.005 to 0.05 wt. % (based on the total weight of the feedstock). In a fifth embodiment, the concentration is at least 1200 ppm.

Characterization of the Catalyst: Characterization of the catalyst of the formula $(R^p)_i(M^t)_a(L^u)_b(S^v)_d(C^w)_e(H^x)_f(O^y)_g(N^z)_h$ having improved morphology and dispersion characteristics can be performed using techniques known in the art, including elemental analysis, Surface Area analysis (BET), Particle Size analysis (PSA), Powder X-ray Diffraction (PXRD), Scanning Electron Microscopy (SEM), Energy Dispersive X-ray Analysis (EDS), and other methods. In one method, electron microscopy is used to complement the x-ray diffraction study. In another method, the surface area of the catalyst is determined using the BET method. In yet another method, scanning tunneling microscopy (STM) and density functional theory (DFT) can be used to characterize the catalyst. Elemental analysis of the catalyst will show presence of Molybdenum, Nickel, Sulfur, as well as Oxygen, Carbon, Hydrogen, and Nitrogen.

In one embodiment, the catalyst has a pore volume of 0.05-5 ml/g as determined by nitrogen adsorption. In a second embodiment, the pore volume is 0.1-4 ml/g. In a third embodiment, from 0.1-3 ml/g. In a fourth embodiment, from 0.1-2 ml/g.

In one embodiment, the catalyst has a surface area of at least 5 $m^2/g$. In a second embodiment, a surface area of at least 10 $m^2/g$. In a third embodiment, a surface area of at least 50 $m^2/g$. In a fourth embodiment, the surface area is greater than 100 $m^2/g$ as determined via the B.E.T. method. In a fifth embodiment, the catalyst has a surface area of greater than 200 $m^2/g$. In a sixth embodiment, the catalyst is characterized by aggregates of crystallites of 10 to 20 angstrom, for an overall surface area greater than 100 m²/g.

In one embodiment, the catalyst has an effective suspended median particle size of 0.0005 to 1000 microns. In a second embodiment, the catalyst has a median particle size of 0.001 to 500 microns. In a third embodiment, a particle size of 0.005 to 100 microns. In a fourth embodiment, a particle size of 0.05 to 50 microns. In a fifth embodiment, the catalyst in the form of a dispersed suspension is characterized by a median particle size of 30 nm to 6000 nm. In a sixth embodiment, the catalyst has an average particle size in the range of 0.3 to 20 μm.

In one embodiment, the slurry catalyst has an average particle size ranging from colloidal (nanometer size) to about 1-2 microns. In another embodiment, the catalyst comprises catalyst molecules and/or extremely small particles that are colloidal in size (i.e., less than 100 nm, less than about 10 nm, less than about 5 nm, and less than about 1 nm), which in a hydrocarbon diluent, forming a slurry catalyst having "clusters" of the colloidal particles, with the clusters having an average particle size in the range of 1-20 microns with a surface area of greater than 100 m²/g. In yet another embodiment, the catalyst composition comprises single layer clusters of nanometer sizes, e.g., 5-10 nm on edge.

In one embodiment, the slurry catalyst is characterized by a crystallite size in the range of 10 to 20 angstrom with a surface area of greater than 100 m²/g. In another embodiment, the catalyst is characterized by a macro-structure aggregate with extremely high apparent pore volumes providing access to the heavy oil molecules to the catalyst.

In one embodiment, the catalyst of the formula $(R^p)_i(M^r)_a(L^u)_b(S^v)_d(C^w)_e(H^x)_f(O^y)_g(N^z)_h$ is characterized via X-ray powder diffraction (LRD or PXRD) as a poorly crystalline compound having diffusion peaks of low intensity. In one embodiment, the catalyst of the formula $((R^p)_i(M^r)_a(L^u)_b(S^v)_d(C^w)_e(H^x)_f(O^y)_g(N^z)_h$ is characterized via X-ray powder diffraction (PXRD) as a poorly crystalline compound having diffraction peaks of low intensity. In one embodiment, the catalyst is characterized as having at least three diffraction peaks located at 2-θ angles of greater than 25°, with ½ height of at least 1° (in 2-θ scale), when measured on a Siemens-D500 diffractometer using 1.54187 Å (Cu K[alpha]1,2) emission wavelength, 1° divergence slit, and scan rate of 1°/min in 0.02° increments. In another embodiment, the catalyst has three diffraction peaks located at Bragg angles (2-θ) of: 25 to 30°, 45 to 50° and 52 to 60° (from 0 to 70° 2-θ scale).

Figure 10:
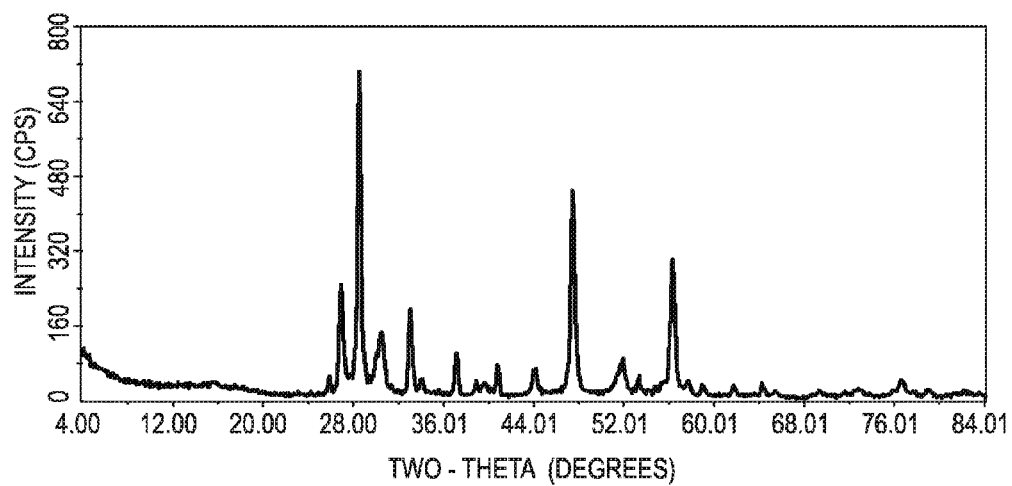
FIG. 10 shows the powder X-ray diffraction pattern of an embodiment of a Fe—Zn oil-based catalyst composition synthesized from oil-soluble dithiocarbamate salts.
Figure 11:
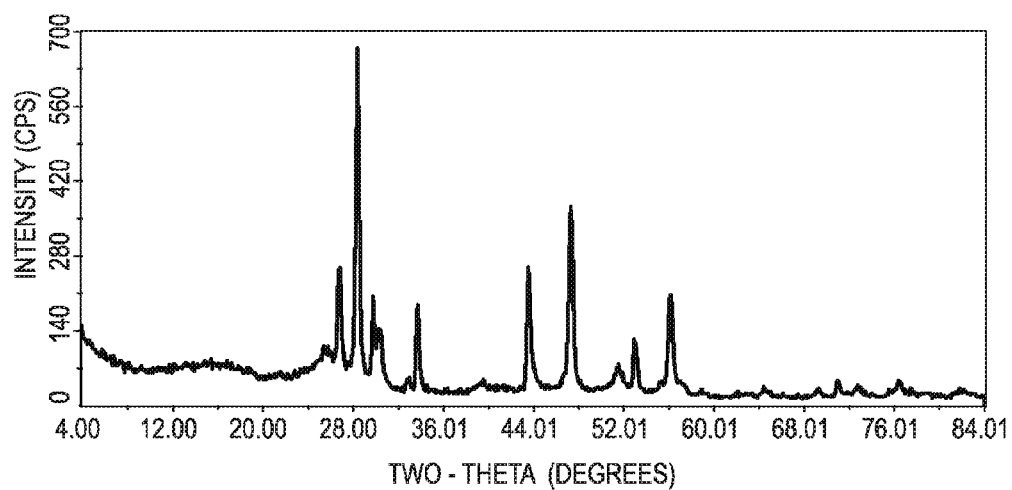
FIG. 11 shows the powder X-ray diffraction pattern of the catalyst in FIG. 10, after a test run (as a spent catalyst).

FIG. 10 shows the X-ray diffraction pattern of an embodiment of a Fe—Zn catalyst synthesized from organic metal precursors, e.g., oil-soluble dithiocarbamates salts, with strong signals at approximately 28.5, 47.5 and 56.5 degrees (in 2-θ scale). FIG. 11 shows the powder X-ray diffraction pattern of the same catalyst after a test run as a spent catalyst.

The catalyst of the formula $(R^p)_i(M^r)_a(L^u)_b(S^v)_d(C^w)_e(H^x)_f(O^y)_g(N^z)_h$ is characterized as giving excellent conversion rates in the upgrades of heavy oil depending on the configuration of the upgrade process and the concentration of the catalyst used. In one embodiment, the slurry catalyst provides conversion rates of at least 70% in one embodiment, at least 75% in a second embodiment, at least 80% in a third embodiment, and at least 90% in a fourth embodiment. In one embodiment of a heavy oil upgrade system employing the catalyst of the formula $(R^p)_i(M^r)_a(L^u)_b(S^v)_d(C^w)_e(H^x)_f(O^y)_g(N^z)_h$ at least 98 wt. % of heavy oil feed is converted to lighter products. In a second embodiment, at least 98.5% of heavy oil feed is converted to lighter products. In a third embodiment, the conversion rate is at least 99%. In a fourth embodiment, the conversion rate is at least 95%. In a fifth embodiment, the conversion rate is at least 80%. As used herein, conversion rate refers to the conversion of heavy oil feedstock to less than 1000° F. (538° C.) boiling point materials.

EXAMPLES

The following illustrative examples are intended to be non-limiting. Unless specified otherwise, the catalytic activity of the catalysts prepared in the examples are tested for Hydrodenitrogenation (HDN), Hydrodesulfurization (HDS), as well as API gravity change and Microcrystalline Carbon Residue (MCRT).

The feedstock for use in the Examples is a mix of 60 wt. % heavy oil (vacuum resid or VR) and 40 wt. % cycle oil diluent, with the properties as indicated in Table 1.

TABLE 1

| Property | 60/40 VR/cycle oil | Cycle oil diluent |
|---|---|---|
| Refractive Index @ 20° C. | 1.6325 | 1.6405 |
| API gravity, 60° F./60° F. | 1.5 | 2.9 |
| MCR, wt. % | 19.12 | 4.30 |
| 1000+° F., wt. % (SimDist) | 46.6 | 0.8 |
| 800+° F., wt. % (SimDist) | 60.1 | 20.0 |
| 650+° F., wt. % (SimDist) | 78.1 | 45.0 |
| Nitrogen, wt. ppm | 5500 | 1600 |
| Sulfur, wt. % | 3.56 | 1.01 |
| H/C molar ratio | 1.280 | 1.041 |

Comparative Ni—Mo Bulk Catalyst Example 1

2663 g of ammonium dimolybdate was combined with 1850 g of hot deionized (DI) water and 1566 g of ammonium hydroxide solution (28% in water). The mixture was stirred and the reactor was heated to ~140° F. After stirring for 20 minutes, a slurry of 673 g of nickel sulfate hexahydrate in 667 g of ammonium hydroxide (28% in water) was added. The mixture was stirred for four hours to dissolve any solids present. At this time the reaction mixture was a dark blue solution. An aqueous ammonium sulfide solution (41.9%) was added at an addition speed of ~91 g·min-1. A total of 9061 g of ammonium sulfide solution was added over 100 minutes. The water-based catalyst precursor was transformed to the oil phase by mixing 3796 g of aqueous based precursor and 3000 g of vacuum gas oil (VGO) in a 3-gallon autoclave and heating to 400° F. under 400 psi of nitrogen. Hydrogen was then added at 32 SCF/h. The reduction was carried out until no $H_2S$ was detected in the exit gas stream. This gave the final catalyst slurry. For catalytic activity evaluation, the solids were separated by centrifugation and tested with a 60 wt. % vacuum resid blend as the heavy oil feed.

Examples 2-4

In these examples, three oil-soluble, sulfur-rich, iron and zinc catalyst precursors were employed: iron(III) dimethyldithiocarbamate (Fe-DTC), zinc diethyldithio-carbamate (Zn-DTC), and zinc diisopropyldithiophosphate (Zn-DTP). Example 3 is a mixed Fe/Zn catalyst, wherein 1:1 weight ratio of Fe:Zn was used with a mixture of iron(III) dimethyldithiocarbamate and zinc diethyldithio-carbamate.

The catalysts were formed in-situ in the amount of 1.7 wt. % on metal basis of VR feed (60/40 mixture of VR to cycle oil), wherein 130 g sample of the VR feed was mixed with the metal precursors, forming sulfided catalysts in-situ. The VR samples including catalysts were added to 1 L batch reactor, where it was pressurized with 1600 psig hydrogen (at 80° F.), heated to 825° F. in 2.5 hours and soaked at that temperature for 2 hours, then rapidly cooled, and products collected and analyzed.

Liquid products were separated via filtration, and analyzed for refractive index at 20° C., API gravity (60° F./60° F.), micro-carbon residue (MCR), boiling curve (simulated distillation, SimDist), nitrogen, and sulfur. From the results shown in Table, it can be seen that the mixed Fe—Zn catalyst had the highest catalytic activity as judged by increased API gravity and reductions in MCR, VR (1000+° F.), as well as in Nitrogen and Sulfur content.

TABLE 2

|  | Feed | Example 2 Zn-DTP | Example 3 Fe-DTC | Example 4 Fe/Zn-DTC |
|---|---|---|---|---|
| Refractive Index @ 20° C. | 1.6325 | 1.5861 | 1.5850 | 1.5708 |
| API gravity, 60° F./60° F. | 1.5 | 9.2 | 10.9 | 13.5 |
| MCR, wt. % | 19.12 | 10.54 | 9.84 | 7.58 |
| 1000+° F., wt. % (SimDist) | 46.6 | 6.6 | 6.8 | 5.2 |
| 800+° F., wt. % (SimDist) | 60.1 | 19.3 | 19.7 | 17.4 |
| 650+° F., wt. % (SimDist) | 78.1 | 43.8 | 43.8 | 41.1 |
| Nitrogen, wt. ppm | 5500 | 4200 | 4244 | 3803 |
| Sulfur, wt. % | 3.56 | 1.55 | 1.20 | 0.96 |
| Ramp/soak time, h | n/a | 2.5/2 | 2.5/2 | 2.5/2 |
| Soak temperature, ° F. | n/a | 825 | 825 | 825 |

The Fe:Zn catalyst of Example 4 was compared with a Mo—Ni catalyst of the prior art (Comparable Example 1). In this experiment, 3 different samples were tested, 170 g of the 60/40 VR/cycle oil feedstock ("VR") by itself without any catalyst (Blank), a mixture of VR and the Mo/Ni comparative catalyst in Example 1, and a mixture of VR and the Fe:Zn catalyst of Example 4. The samples were added to 1 L batch reactor, wherein the reactor was pressurized with 1350 psig hydrogen (at 180° F.), heated to 805° F. in 1.5 hours and soaked at that temperature for 2 hours, then rapidly cooled, and products collected and analyzed. Reaction slurry was centrifuged and filtered to separate the wet solids ("solids in product slurry" in the data table), which then were washed with toluene and dried to determine the amount of toluene-insoluble material (defined as "toluene-insolubles" or coke in the data table). Liquid products were analyzed for refractive index at 20° C., API gravity (60° F./60° F.), micro-carbon residue (MCR), and sulfur. The results are shown in Table 3 and compared with the properties of the starting 60/40 VR feed.

TABLE 3

|  | 60/40 Feed | Example 4 Fe/Zn-DTC | Example 1 Mo—Ni | Blank |
|---|---|---|---|---|
| Refractive Index @ 20° C. | 1.6325 | 1.5884 | 1.5779 | 1.6048 |
| API gravity, 60° F./60° F. | 1.5 | 10.3 | 12.3 | 8.9 |
| MCR, wt. % | 19.12 | 12.04 | 10.46 | 14.96 |
| Sulfur, wt. % | 3.56 | 2.21 | 1.68 | 2.38 |
| H/C molar ratio | 1.28 | 1.282 | 1.323 | 1.239 |
| Solids in product slurry, g | 0.0 | 7.8 | 8.21 | 17.2 |
| Toluene-insolubles (coke), g | 0.0 | 0.6 | 0.0 | 4.8 |
| Ramp/soak time, h | n/a | 1.5/2 | 1.5/2 | 1.5/2 |
| Soak temperature, ° F. | n/a | 805 | 805 | 805 |

TABLE 3-continued

|  | Example 4 Fe/Zn-DTC | Example 1 Mo—Ni | Blank |
|---|---|---|---|
| 60/40 Feed |  |  |  |

Mass balance data for the experiments is given in Table 4.

TABLE 4

|  | Fe/Zn-DTC | Mo—Ni | Blank |
|---|---|---|---|
| Total feed + catalyst to reactor, g | 155.12 | 159.55 | 155.75 |
| Hydrogen to reactor, g | 6.70 | 6.70 | 6.25 |
| Total feed to unit, g | 161.82 | 166.25 | 162.00 |
| Liquid yield (solids-free), g | 130.15 | 137.24 | 105.30 |
| Toluene Extracts from reactor & catalyst, g | 14.15 | 14.32 | 37.16 |
| Dry solids (catalyst(if applies) + coke), g | 2.10 | 5.31 | 4.78 |
| Gas vented out, g | 18.76 | 13.25 | 16.08 |
| Total products out, g | 165.16 | 167.63 | 163.32 |
| Recovery (mass balance), % | 102.1 | 100.8 | 100.8 |

Example 5

In this example, a number of oil-soluble, sulfur-rich, iron and zinc catalyst precursors were employed at different Fe:Zn ratios: iron(III) dimethyldithiocarbamate (Fe-DTC), zinc diethyldithio-carbamate (Zn-DTC). The catalysts were formed in-situ in the amount of 2 wt. % of total metals relative to VR, wherein 130 g sample of the VR feed (60/40 mixture of VR to cycle oil) was mixed with the metal precursors. The VR samples including catalysts were added to 1 L batch reactor, where it was pressurized with 1600 psig hydrogen (at 80° F.), heated to 825° F. in 2.5 hours and soaked at that temperature for 2 hours, then rapidly cooled, and products collected and analyzed, in a procedure similar to Examples 2-4.

From the results shown in Table, it is observed that the mixed Fe—Zn catalyst had the highest catalytic activity at Fe:Zn weight ratios in the vicinity of 1:1; with Zinc component content of 60 wt. % (in total Fe+Zn on metals basis) being desirable for feed upgrading.

TABLE 5

| | Fe:Zn ratio | | | | |
| --- | --- | --- | --- | --- | --- |
| | 1:10 | 1:3 | 1:1 | 3:1 | 10:1 |
| Refractive Index @ 20° C. | 1.5894 | 1.5878 | 1.5823 | 1.5925 | 1.5875 |
| API gravity, 60° F./60° F. | 8.3 | 9.5 | 10.9 | 8.8 | 8.7 |
| MCR, wt. % | 11.59 | 10.80 | 10.75 | 12.19 | 12.74 |
| Sulfur, wt. % | 1.69 | 1.47 | 1.48 | 1.83 | 1.82 |
| H/C molar ratio | 88.12 | 89.37 | 88.89 | 89.17 | 89.56 |
| Ramp/soak time, h | 2.5/2 | 2.5/2 | 2.5/2 | 2.5/2 | 2.5/2 |
| Soak temperature, ° F. | 825 | 825 | 825 | 825 | 825 |

Figure 12:
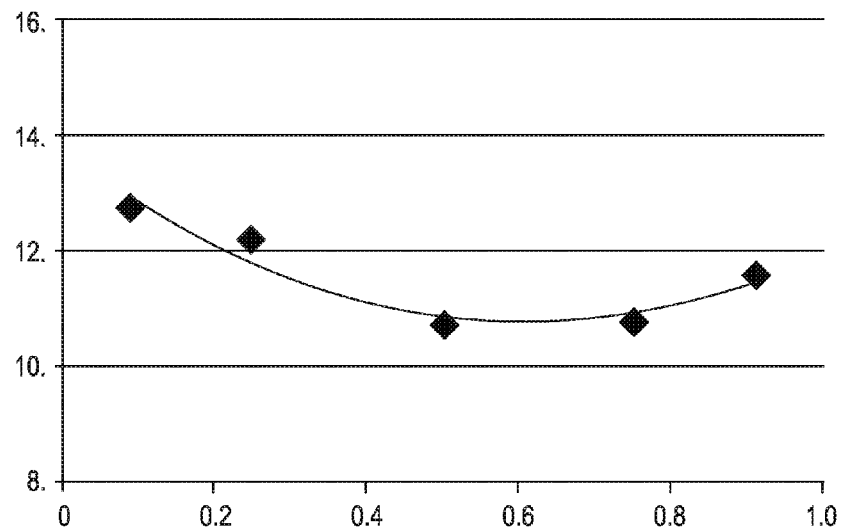
FIG. 12 is a graph showing the changes in the micro carbon residue (MCR) wt. % in varying the Zn to Fe+Zn weight ratio.
Figure 13:
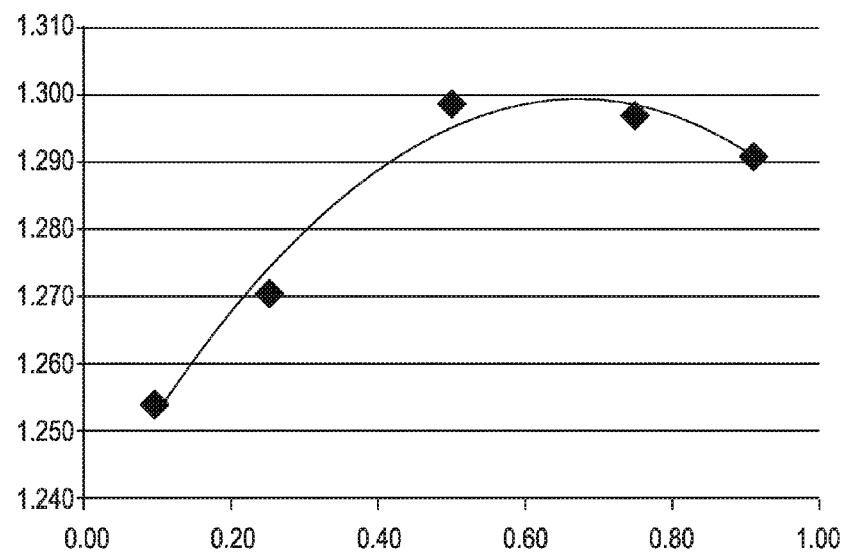
FIG. 13 is another graph showing the relationship between the hydrogen to carbon (H/C) molar ratio relative to the Zn to Fe+Zn weight ratio.

FIG. 12 plots the changes in MCR wt. % relative to the Zn to Fe+Zn weight ratio from the resid. tests in Example 5. FIG. 13 is a graph showing the change in H/C molar ration relative to the Zn to Fe+Zn weight ratio from the resid. Tests.

Example 6

A sample of a bulk iron-zinc sulfide catalyst was prepared from inorganic salts by sulfiding an aqueous solution of iron (III) and zinc nitrates with ammonium sulfide. The resulting water-based catalyst precursor was transformed to a final oil-based catalyst with medium cycle oil (MCO), and water was evaporated off in a stream of hydrogen at 450° F. Testing with a heavy oil feedstock was identical to conditions of Examples 2-4. Experimental results are shown in Table 6, with data for a blank run (no catalyst) also included for comparison. As shown, MCR was significantly reduced and API gravity increased.

TABLE 6

| | Feed | Example 6 Fe/Zn-sulfide (1) | Blank |
| --- | --- | --- | --- |
| Refractive Index @ 20° C. | 1.6325 | 1.6099 | 1.6048 |
| API gravity, 60° F./60° F. | 1.5 | 9.7 | 8.9 |
| MCR, wt. % | 19.12 | 11.98 | 14.96 |
| Sulfur, wt. % | 3.56 | 2.20 | 2.38 |
| H/C molar ratio | 1.28 | 1.267 | 1.239 |
| Solids in product slurry, g | 0.0 | 8.7 | 17.2 |
| Toluene-insolubles (coke), g | 0.0 | 3.6 | 4.8 |
| Ramp/soak time, h | n/a | 1.5/2 | 1.5/2 |
| Soak temperature, ° F. | n/a | 805 | 805 |

A sample of bulk iron-zinc slurry catalyst was prepared from a mixture of iron(III) dimethyldithiocarbamate and zinc diethyldithiocarbamate at 1:1 ratio (metals basis) via thermal decomposition in oil under hydrogen pressure (700° F., 1000 psig). The iron-zinc slurry catalyst was subsequently tested under the conditions similar to those of Examples 2-4. Experimental results are shown in Table 7, with data for a blank run (no catalyst) also included for comparison

TABLE 7

| | Feed | Fe/Zn-sulfide | Blank |
| --- | --- | --- | --- |
| Refractive Index @ 20° C. | 1.6325 | 1.5928 | 1.6048 |
| API gravity, 60° F./60° F. | 1.5 | 10.3 | 8.9 |
| MCR, wt. % | 19.12 | 12.40 | 14.96 |
| Sulfur, wt. % | 3.56 | 2.24 | 2.38 |
| H/C molar ratio | 1.28 | 1.303 | 1.239 |
| Solids in product slurry, g | 0.0 | 8.9 | 17.2 |
| Toluene-insolubles (coke), g | 0.0 | 1.8 | 4.8 |
| Soak time, h | n/a | 2 | 2 |
| Soak temperature, ° F. | n/a | 805 | 805 |

Compared to the blank run, tests with Fe—Ni catalysts show lower levels of solids in product slurry, which is important for a heavy oil upgrade process.

Example 7 (Fe/Zn)

In this Example, performance of a sulfided Fe—Zn based catalyst was compared to a sulfided Zn-based catalyst and a sulfided iron-based catalyst.

In Run 1, a solution of a mixed catalyst precursor iron nitrate ($Fe(NO_3)_3 \cdot 9H_2O$) and zinc nitrate ($Zn(NO_3)_2 \cdot 6H_2O$) dissolved in methanol was prepared. A sample of moisture-free coal feed (i.e. less than 1% by weight water) having a particle size of less than 100 mesh was impregnated to incipient wetness with the solution, at a solution to coal weight ratio of 1:1, yielding an Fe/coal loading on a dry, ash-free (daf) basis of 1% Fe and a Zn/coal loading on a daf basis of 1 wt % Zn. The catalyst impregnated coal was then dried under N2 at 105° C. for up to 24 hr for to remove the methanol. The dried catalyst impregnated coal was mixed with an FCC-type process oil (500° F.+cut) as solvent, at a solvent:coal ratio of 1.6:1.

Elemental sulfur was added to sulfide the iron and zinc, at a S:Fe molar ratio of 2:1 and a S:Zn ratio of 2:1. The mixture was then heated quickly in a vessel to 200° C., and held at 200° C. for 2 hours, while the hydrogen partial pressure within the vessel increased from about 100 psia to about 1000 psia. The mixture was then further heated to 430° C., and then held at 430° C. for 3 hours under a hydrogen partial pressure of 2500 psia. After 3 hours the reaction vessel containing the sulfided solvent/coal mixture, hydrogen and any reaction products was quenched to room temperature. Product gases (CO, CO2, C1, C2 and C3) were vented through a wet test meter to determine the gas yield. Solids, primarily unconverted coal, ash and catalyst sulfide were separated from liquid products (C4+) by filtration.

Run 2 is a repeat of Run 1 wherein zinc nitrate was used as the catalyst precursor at a Zn to coal loading on a daf basis of 2 wt % Zn. Elemental sulfur was added to sulfide the zinc, at a S to Zn ratio of 2:1.

Run 3 is a repeat of Run 1, wherein iron nitrate was used as the catalyst precursor at an iron to coal loading daf basis of 2 wt % Fe. Elemental sulfur was added to sulfide the iron at a S to Fe ratio of 2:1.

Coal conversion was determined as follows: (solids recovered−(ash in coal+recovered catalyst))/coal feed. By subtracting the solvent added at the beginning of the run, oil yield was determined based on coal daf (dry, ash-free) basis. Product yields comparing the three runs are tabulated in Table 8.

TABLE 8

| Run | Reaction Condition | Liquid Yield | Coal Conversion | Gas Yield |
|---|---|---|---|---|
| 1 | 430° C., 3 hr, 1% Zn, 1% Fe, S | 73.8 | 97.8 | 16.4 |
| 2 | 430° C., 3 hr, 2% Zn, S | 50.4 | 80.6 | 25.3 |
| 3 | 430° C., 3 hr, 2% Fe, S | 68.7 | 94.8 | 15.5 |

Example 8 (Fe/Ni)

In this Example, performance of a sulfided Fe—Ni based catalyst was compared to a sulfided Ni-based catalyst and an unsulfided Ni-based catalyst. In Run 1, a solution of a mixed catalyst precursor in methanol was prepared from a mixture of iron nitrate ($Fe(NO_3)_3.9H_2O$) and nickel nitrate. As in Run 1 of Example 7, the catalyst precursor was loaded onto coal at an iron to coal loading on a daf basis of 1 wt % Fe, and a Ni to coal loading on a daf basis of 1 wt % Ni. Elemental sulfur was added to sulfide the iron and nickel, at a S to Fe molar ratio of 2:1 and a S to Ni ratio of 2:1.

In Run 2, nickel nitrate was used as the catalyst precursor at a Ni to coal loading at a daf basis of 2 wt % Zn. Elemental sulfur was added to sulfide the nickel, at a S to Ni ratio of 2:1. Product yields comparing the runs are tabulated in Table 9.

TABLE 9

| Run | Reaction Condition | Liquid Yield | Coal Conversion | Gas Yield |
|---|---|---|---|---|
| 1 | 430° C., 3 hr, 1% Ni, 1% Fe, S | 73.3 | 97.5 | 16.1 |
| 2 | 430° C., 3 hr, 2% Ni, S | 73.4 | 96.8 | 14.9 |

Example 9 (Fe/Cu)

In this Example, performance of a sulfided Fe—Cu based catalyst was compared to a sulfided Cu-based catalyst and an unsulfided Cu-based catalyst. In Run 1, a solution of a mixed catalyst precursor in methanol employing iron nitrate ($Fe(NO_3)_3.9H2O$) and copper nitrate was prepared. The conditions of Run 1 (Example 7) were repeated with the mixed Fe/Cu catalyst precursor at a Fe to coal loading on a daf basis of 1 wt % Fe, and a Cu to coal loading on a daf basis of 1 wt % Cu.

In Run 2, Run 1 was repeated but with copper nitrate as the catalyst precursor at a Ni/coal loading on a daf basis of 2 wt. % Cu. Elemental sulfur was added to sulfide the copper at an S to Cu ratio of 2:1. Product yields are tabulated in Table 10.

TABLE 10

| Run | Reaction Condition | Liquid Yield | Coal Conversion | Gas Yield |
|---|---|---|---|---|
| 1 | 430° C., 3 hr, 1% Cu, 1% Fe, S | 71.1 | 96.6 | 19.8 |
| 2 | 430° C., 3 hr, 2% Cu, S | 71.3 | 96.3 | 17.4 |

Example 10 (Fe/Co)

Performance of a sulfided Fe—Co based catalyst was compared to a sulfided Co-based catalyst and an unsulfided Co-based catalyst. In Run 1, a solution of a mixed catalyst precursor in methanol was prepared from iron nitrate ($Fe(NO_3)_3.9H_2O$) and cobalt nitrate. The conditions of Run 1 (Example 7) were repeated with the mixed Fe/Co catalyst precursor, at an Fe to coal loading on a daf basis of 1 wt % Fe, and a Co to coal loading on a daf basis of 1 wt % Co. Elemental sulfur was added to sulfide the iron and cobalt at a S to Fe molar ratio of 2:1 and a S to Co ratio of 2:1. Products yields are tabulated in Table 11.

TABLE 11

| Run | Reaction Condition | Liquid Yield | Coal Conversion | Gas Yield |
|---|---|---|---|---|
| 1 | 430° C., 3 hr, 1% Co, 1% Fe, S | 72.8 | 97.6 | 16.8 |

Example 11 (Fe/Cr)

Performance of a sulfided Fe—Cr based catalyst was compared to a sulfided Cr-based catalyst and an unsulfided Cr-based catalyst. In Run 1, a solution of a mixed catalyst precursor in methanol using iron nitrate ($Fe(NO3)3.9H2O$) and chromium nitrate was prepared. The conditions of Run 1 (Example 7) were repeated with the mixed catalyst precursor at a Fe to coal loading on a daf basis of 1 wt % Fe, and a Cr/coal loading on a daf basis of 1 wt % Cr. Elemental sulfur was added to sulfide the iron and chromium, at a S:Fe molar ratio of 2:1 and a S:Cr ratio of 2:1.

In Run 2, the conditions of Run 1 were repeated using chromium nitrate as the catalyst precursor at a Cr to coal loading on a daf bases of 2 wt % Cr. Elemental sulfur was added to sulfide the chromium, at an S to Cr ratio of 2:1. In Run 3, Run 2 was repeated by without the added sulfur. Products yields are tabulated in Table 12.

TABLE 12

| Run | Reaction Condition | Liquid Yield | Coal Conversion | Gas Yield |
|---|---|---|---|---|
| 1 | 430° C., 3 hr, 1% Cr 1% Fe, S | 64.8 | 91.9 | 18.8 |
| 2 | 430° C., 3 hr, 2% Cr, S | 34.4 | 65.6 | 21.0 |
| 3 | 430° C., 3 hr, 2% Cr | 37.1 | 66.4 | 20.0 |

Example 12 (Fe/Ti)

Performance of a sulfided Fe—Ti based catalyst was compared to a sulfided Ti-based catalyst and an unsulfided Tibased catalyst. The conditions of Run 1 (Example 7) were repeated with the coal being impregnated with an iron nitrate ($Fe(NO3)3.9H2O$) catalyst precursor at an Fe/coal loading on a daf basis of 1 wt % Fe. Titanium diethyl dithiocarbamate was next blended in the solvent coal mixture to yield a Ti/coal loading on a daf basis of 1 wt % Ti. Elemental sulfur was added, at a S:Ti molar ratio of 2:1.

In Run 2, a sample of moisture-free coal feed (i.e. less than 1% by weight water) having a particle size of less than 100 mesh was mixed with an FCC-type process oil (500° F.+cut) as solvent, at a solvent:coal ratio of 1.6:1. Titanium diethyl dithiocarbamate was blended in the solvent coal mixture to yield a Ti/coal loading on a daf basis of 1 wt % Ti. Elemental sulfur was added, at a S to Ti molar ratio of 2:1. The mixture was then heated quickly in a vessel to 200° C., and held at 200° C. for 2 hours, while the hydrogen partial pressure within the vessel increased from about 100 psia to about 1000 psia. The mixture was then further heated to 430° C., and then held at 430° C. for 3 hours under a hydrogen partial pressure of 2500 psia. Products yields from the runs are tabulated in Table 13.

TABLE 13

| Run | Reaction Condition | Liquid Yield | Coal Conversion | Gas Yield |
|---|---|---|---|---|
| 1 | 430° C., 3 hr, 1% Ti, 1% Fe, S | 72.3 | 96.5 | 15.0 |
| 2 | 430° C., 3 hr, 2% Ti, S | 50.5 | 83.5 | 29.6 |

For purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for preparing a catalyst composition comprising:
   i) providing a catalyst precursor comprising at least two metal precursors of different "d" block element metals in a solvent carrier, wherein the at least two metal precursors of different "d" block element metals are selected from the group consisting of iron(III) nitrate, zinc nitrate, ferric sulfide, ferrouos sulfide, iron sulfide, zinc sulfide, ferric sulfate, ferric nitrate, ferric phosphate, nickel sulfate, nickel nitrate, nickel phosphate, nickel acetate, and mixtures thereof;
   ii) combining the catalyst precursor with a sulfiding agent and a hydrocarbon feedstock, forming at least a sulfided catalyst having a formula $(R^p)_i(M^t)_a(L^u)_b(S^v)_d(C^w)_e(H^x)_f(O^y)_g(N^z)_h$, wherein
   R is optional, R is at least a lanthanoid element metal or an alkaline earth metal;
   M is at least a "d" block element metal selected from the group consisting of titanium, chromium, manganese, iron, cobalt, nickel, copper and zinc;
   L is at least a "d" block element metal different from the "d" block element metal M;
   $0 \leq i \leq 1$;
   $0 < b/a \leq 5$,
   $0.5(a+b) \leq d \leq 5(a+b)$,
   $0 < e \leq 11(a+b)$,
   $0 < f \leq 7(a+b)$,
   $0 < g \leq 5(a+b)$,
   $0 < h \leq 2(a+b)$,
   p, t, u, v, w, x, y, z, each representing total charge for each of: M, L, S, C, H, O and N, respectively, wherein pi+ta+ub+vd+we+xf+yg+zh=0.

2. The process of claim 1, wherein the catalyst has an X-ray powder diffraction pattern with at least three diffraction peaks located at 2-θ angles of greater than 25°.

3. The process of claim 1, wherein the sulfiding agent is selected from the group of elemental sulfur, ammonium sulfide, ammonium polysulfide ($[(NH_4)_2S_x]$), ammonium thiosulfate ($(NH_4)_2S_2O_3$), sodium thiosulfate $Na_2S_2O_3$), thiourea $CSN_2H_4$, carbon disulfide, dimethyl disulfide (DMDS), dimethyl sulfide (DMS), tertiarybutyl polysulfide (PSTB), tertiarynonyl polysulfide (PSTN), mercaptanes, thioglycols, and mixtures thereof.

4. The process of claim 1, wherein the solvent carrier is selected from the group of alcohols, ketones, aldehydes, citric acid, carboxylic acids, water, and mixtures thereof.

5. The process of claim 3, wherein the solvent carrier is an alcohol solution.

6. The process of claim 1, wherein at least one of the metal precursors is an organic precursor.

7. The process of claim 1, wherein the hydrocarbon feedstock is a heavy oil feed, and wherein the catalyst precursor is combined with the sulfiding agent in the heavy oil feed for an in-situ sulfidation of the catalyst precursor.

8. The process of claim 7, wherein the in-situ sulfidation is carried out at a temperature ranging from ambient to 500° C., a pressure from ambient to 2800 psi, a liquid hourly space velocity of 0.05 to 10 h-1, and hydrogen gas rate from 200 to 15,000 SCF/B.

9. The process of claim 1, wherein the hydrocarbon feedstock comprises solid carbonaceous particles, and wherein the catalyst precursor is combined with the sulfiding agent, at least a solvent, and the solid carbonaceous particles in a coal liquefaction reactor for an in-situ sulfidation of the catalyst precursor.

10. The process of claim 8, wherein the in-situ sulfidation is carried out at a temperature of at least 200° C. and a pressure in the range of 300-5000 psig for at least 10 minutes.

11. The process of claim 1, wherein the sulfiding agent is added directly to the catalyst precursor for an ex-situ sulfidation of the catalyst precursor prior to combining with the hydrocarbon feedstock.

12. The process of claim 1, wherein the at least a sulfur additive is added to the sulfiding step, wherein the sulfur additive is selected from the group of elemental sulfur, thiodiazoles, thio acids, thio amides, thiocyanates, thio esters, thiophenols, thiosemicarbazides, thioureas, mercapto alcohols, dialkyl sulfides, dihydroxyalkyl sulfides, diaryl sulfides, diaralkyl sulfides, dimethyl sulfoxides, diethanol disulfide, tert-nonylpolysulfides, dimethyl sulphide, dimethyl disulphide, 2,2-dithiobis ethanol, and mixtures thereof.

13. The process of claim 1, wherein a sufficient amount of metal precursors are provided for b/a to have a molar ratio ranging from 0.10 to 5.0.

14. The process of claim 1, wherein M is Fe and L is Zn with a molar ratio Fe to Zn ranging from 1:10 to about 10:1.

15. The process of claim 1, wherein M is selected from iron and nickel and mixtures thereof, L is selected from nickel and iron and mixtures thereof, and M is different from L.

16. The process of claim 1, wherein M is selected from copper and iron and mixtures thereof, L is selected from copper and iron and mixtures thereof, and M is different from L.

17. The process of claim 1, wherein M is selected from cobalt and iron and mixtures thereof, L is selected from cobalt and iron and mixtures thereof, and M is different from L.

18. The process of claim 1, wherein M is selected from chromium and iron and mixtures thereof, L is selected from chromium and iron and mixtures thereof, and M is different from L.

19. The process of claim 1, wherein M is selected from titanium and iron and mixtures thereof, L is selected from titanium and iron and mixtures thereof, and M is different from L.

20. A process for preparing a catalyst composition comprising:
i) providing a catalyst precursor comprising at least two metal precursors of different "d" block element metals in a solvent carrier, wherein the at least two metal precursors of different "d" block element metals are selected from the group consisting of iron(III) nitrate, zinc nitrate, ferric sulfide, ferrouos sulfide, iron sulfide, zinc sulfide, ferric sulfate, ferric nitrate, ferric phosphate, nickel sulfate, nickel nitrate, nickel phosphate, nickel acetate, and mixtures thereof;
ii) combining the catalyst precusor with a sulfiding agent for a sulfided catalyst precursor;
iii) combining the sulfided catalyst precursor with a hydrocarbon feedstock, forming a catalyst composition having a formula $(R^p)_i(M^t)_a(L^u)_b(S^v)_d(C^w)_e(H^x)_f(O^y)_g(N^z)_h$, wherein
R is optional, R is at least a lanthanoid element metal or an alkaline earth metal;
M is at least a "d" block element metal selected from the group consisting of titanium, chromium, manganese, iron, cobalt, nickel, copper and zinc;
L is at least a "d" block element metal different from the "d" block element metal M;
$0<=i<=1$;
$0<b/a=<5$,
$0.5(a+b)<=d<=5(a+b)$,
$0<e<=11(a+b)$,
$0<f<=7(a+b)$,
$0<g<=5(a+b)$,
$0<h<=2(a+b)$,
p, t, u, v, w, x, y, z, each representing total charge for each of: M, L, S, C, H, O and N, respectively, wherein pi+ta+ub+vd+we+xf+yg+zh=0.

21. The process of claim 20, wherein the catalyst has an X-ray powder diffraction pattern with at least three diffraction peaks located at 2-θ angles of greater than 25°.

22. The process of claim 20, wherein the solvent carrier is selected from the group of alcohols, citric acid, carboxylic acids, aldehydes, water, and mixtures thereof.

23. The process of claim 20, wherein the sulfiding agent is selected from the group of elemental sulfur, ammonium sulfide, ammonium polysulfide ($[(NH_4)_2S_x$), ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), tertiarybutyl polysulfide (PSTB), tertiarynonyl polysulfide (PSTN), mercaptanes, thioglycols, and mixtures thereof.

24. A process for preparing a catalyst composition comprising:
i) providing a catalyst precursor comprising at least two metal precursors of different "d" block element metals in a solvent carrier, wherein the at least two metal precursors of different "d" block element metals are selected from the group consisting of iron(III) nitrate, zinc nitrate, ferric sulfide, ferrouos sulfide, iron sulfide, zinc sulfide, ferric sulfate, ferric nitrate, ferric phosphate, nickel sulfate, nickel nitrate, nickel phosphate, nickel acetate, and mixtures thereof;
ii) impregnating a hydrocarbon feedstock comprising solid carbonaceous particles with the catalyst precursor;
iii) combining the impregnated hydrocarbon feedstock with a solvent and a sulfiding agent forming a catalyst composition having a formula $(R^p)_i(M^t)_a(L^u)_b(S^v)_d(C^w)_e(H^x)_f(O^y)_g(N^z)_h$, wherein
R is optional, R is at least a lanthanoid element metal or an alkaline earth metal;
M is at least a "d" block element metal selected from the group consisting of titanium, chromium, manganese, iron, cobalt, nickel, copper and zinc;
L is at least a "d" block element metal different from the "d" block element metal M;
$0<=i<=1$;
$0<b/a=<5$,
$0.5(a+b)<=d<=5(a+b)$,
$0<e<=11(a+b)$,
$0<f<=7(a+b)$,
$0<g<=5(a+b)$,
$0<h<=2(a+b)$,
p, t, u, v, w, x, y, z, each representing total charge for each of: M, L, S, C, H, O and N, respectively, wherein pi+ta+ub+vd+we+xf+yg+zh=0.

25. The process of claim 24, wherein the catalyst has an X-ray powder diffraction pattern with at least three diffraction peaks located at 2-θ angles of greater than 25°.

26. The process of claim 24, wherein the sulfiding agent is selected from the group of elemental sulfur, ammonium sulfide, ammonium polysulfide ($[(NH_4)_2S_x$), ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), tertiarybutyl polysulfide (PSTB), tertiarynonyl polysulfide (PSTN), mercaptanes, thioglycols, and mixtures thereof.

27. The process of claim 24, wherein the solvent carrier is selected from the group of alcohols, citric acid, carboxylic acids, aldehydes, water, and mixtures thereof.

* * * * *